United States Patent
Kato et al.

(10) Patent No.: US 6,477,306 B2
(45) Date of Patent: *Nov. 5, 2002

(54) DISPERSION-COMPENSATING OPTICAL FIBER, AND, OPTICAL TRANSMISSION LINE AND DISPERSION-COMPENSATING MODULE RESPECTIVELY INCLUDING THE SAME

(75) Inventors: Takatoshi Kato; Masaaki Hirano, both of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 5 days.

(21) Appl. No.: 09/735,888

(22) Filed: Dec. 14, 2000

(65) Prior Publication Data

US 2001/0033724 A1 Oct. 25, 2001

Related U.S. Application Data

(60) Provisional application No. 60/196,160, filed on Apr. 11, 2000.

(30) Foreign Application Priority Data

Apr. 11, 2000 (JP) ........................................ 2000-109730

(51) Int. Cl.$^7$ ................................................. G02B 6/02
(52) U.S. Cl. .................. 385/123; 385/123; 385/95; 385/96; 385/98; 385/124; 385/126; 385/127; 385/141
(58) Field of Search ........................... 385/123, 95, 96, 385/98, 124, 126, 127, 141

(56) References Cited

U.S. PATENT DOCUMENTS

| | | | | |
|---|---|---|---|---|
| 5,361,319 A | | 11/1994 | Antos et al. ................. | 385/123 |
| 5,838,867 A | | 11/1998 | Onishi et al. ................ | 385/123 |
| 5,854,871 A | * | 12/1998 | Akasaka ...................... | 385/123 |
| 5,878,182 A | * | 3/1999 | Peckham ..................... | 385/123 |
| 6,009,221 A | | 12/1999 | Tsuda et al. ................. | 385/123 |
| 6,031,956 A | * | 2/2000 | Li et al. ....................... | 385/124 |
| 6,263,138 B1 | | 7/2001 | Sillard et al. ............... | 385/123 |
| 6,345,140 B1 | * | 2/2002 | Sasaoka et al. ............. | 385/123 |
| 6,349,163 B1 | | 2/2002 | Antos et al. ................. | 385/127 |
| 2002/0012510 A1 | | 1/2002 | Jiang et al. ................. | 385/123 |
| 2002/0018631 A1 | | 2/2002 | Arai et al. ................... | 385/127 |

FOREIGN PATENT DOCUMENTS

| | | | | |
|---|---|---|---|---|
| EP | 1 004 905 A1 | 11/1999 | ................. | 385/127 |
| JP | 6-11620 | 1/1994 | ................. | 385/123 |
| WO | WO00/17685 | 3/2000 | ................. | 385/123 |

OTHER PUBLICATIONS

"1.5 Terabit/s WDM Transmission of 150 Channels at 10Gbit/s Over 4X100km of TeraLight™ Fibre" by Bigo et al., ECOC '99, pp. 40–41.

"Reduced Dispersion Slope, Non–Zero Dispersion Fiber" by Peckham et al., ECOC '98 (Sep. 20–24, 1998), pp. 139–140.

"New Dispersion Compensating Fibres for Simultaneous Compensation of Dispersion and Dispersion Slope of Non–Zero Dispersion Shifted Fibres in the C or L Band" by Grüner–Nielsen et al., OFC '2000, TuG6–1/101–103.

"Dispersion Slope Compensating Fibers for L–Band WDM Systems Using NZ–DSF" by Sugizaki, OFC'2000, TuG4–1/95–97.

"Dispersion Compensating Fibres and Perspectives for Future Developments" by Grüner–Nielsen et al., ECOC/2000, pp. 91–94.

* cited by examiner

*Primary Examiner*—Brian Healy
(74) *Attorney, Agent, or Firm*—McDermott, Will & Emery

(57) ABSTRACT

The invention is directed to a dispersion-compensating optical fiber which can compensate for the chromatic dispersion and dispersion slope of a non-zero dispersion-shifted optical fiber by a short length. The dispersion-shifted optical fiber constitutes an optical transmission line together with a dispersion-compensating optical fiber fusion-spliced thereto. The dispersion-compensating optical fiber has, at a wavelength of 1550 nm, a chromatic dispersion $D_{DCF}$ of $-40$ ps/nm/km or less and a ratio ($D_{DCF}/S_{DCF}$) of dispersion slope $S_{DCF}$ to the chromatic dispersion $D_{DCF}$ of 0.005/nm or more.

31 Claims, 17 Drawing Sheets

DISPERSION-COMPENSATING OPTICAL FIBER, AND, OPTICAL TRANSMISSION LINE AND DISPERSION-COMPENSATING MODULE RESPECTIVELY INCLUDING THE SAME

RELATED APPLICATIONS

This application claims priority from U.S. Provisional Patent Application Ser. No. 60/196,160, filed Apr. 11, 2000, and is incorporated herein by reference.

BACKGROUND OF THE INVENTION

1. Field of the Invention

The present invention relates to a dispersion-compensating optical fiber which compensates for the chromatic dispersion and dispersion slope of a dispersion-shifted optical fiber, an optical transmission line including the dispersion-shifted optical fiber and dispersion-compensating optical fiber, and a dispersion-compensating module formed by winding the dispersion-shifted optical fiber like a coil.

2. Related Background Art

For achieving further higher speed and larger capacity in optical transmission systems which carry out wavelength division multiplexing (WDM) optical transmission, it is important that the absolute value of accumulated chromatic dispersion be as small as possible in a wide signal wavelength band. In general, since it is hard to achieve in an optical transmission line using only one kind of optical fiber, a plurality of kinds of optical fibers have been connected so as to construct an optical transmission line, thereby lowering the absolute value of accumulated chromatic dispersion in the optical transmission line in a wide band.

For example, Japanese Patent Application Laid-Open No. HEI 6-11620 discloses a technique in which a standard single-mode optical fiber (SMF) having a zero-dispersion wavelength near a wavelength of 1.3 $\mu$m and a dispersion-compensating optical fiber (DCF) which compensates for the chromatic dispersion of this standard single-mode optical fiber at a wavelength of 1550 nm are connected to each other, so as to reduce the absolute value of accumulated chromatic dispersion of the optical transmission line constructed by thus connected optical fibers in a 1.55-$\mu$m wavelength band.

Also, U.S. Pat. No. 5,838,867 discloses a technique in which a non-zero dispersion-shifted optical fiber (NZDSF) having a small positive chromatic dispersion at a wavelength of 1550 nm and a dispersion-compensating optical fiber which compensates for the chromatic dispersion and dispersion slope of this dispersion-shifted optical fiber are connected to each other, so as to lower the absolute value of accumulated chromatic dispersion of the optical transmission line constructed by thus connected optical fibers in a 1.55-$\mu$m wavelength band.

Here, the chromatic dispersion of a standard single-mode optical fiber (SMF) at a wavelength of 1550 nm is referred to as $D_{SMF}$, and its dispersion slope is referred to as $S_{SMF}$. The chromatic dispersion of a non-zero dispersion-shifted optical fiber (NZDSF) at a wavelength of 1550 nm is referred to as $D_{DSF}$, and its dispersion slope is referred to as $S_{DSF}$. The chromatic dispersion of a dispersion-compensating optical fiber (DCF) at a wavelength of 1550 nm is referred to as $D_{DCF}$, and its dispersion slope is referred to as $S_{DCF}$. Then, for reducing the absolute value of accumulated chromatic dispersion of an optical transmission line in a wide band including a wavelength of 1550 nm, it is required in a dispersion-compensating optical fiber (hereinafter referred to as "dispersion-compensating optical fiber for SMF") for compensating for both of the chromatic dispersion and dispersion slope of the single-mode optical fiber that its ratio ($S_{DCF}/D_{DCF}$) of dispersion slope $S_{DCF}$ to the chromatic dispersion $D_{DCF}$ be substantially equal to the ratio ($S_{SMF}/D_{SMF}$) of dispersion slope $S_{SMF}$ to the chromatic dispersion $D_{SMF}$ of the single-mode optical fiber. Also, it is required in a dispersion-compensating optical fiber (hereinafter referred to as "dispersion-compensating optical fiber for DSF") for compensating for both of the chromatic dispersion and dispersion slope of the dispersion-shifted optical fiber that its ratio ($S_{DCF}/D_{DCF}$) of dispersion slope $S_{DCF}$ to the chromatic dispersion $D_{DCF}$ be substantially equal to the ratio ($S_{DSF}/D_{DSF}$) of dispersion slope $S_{DSF}$ to the chromatic dispersion $D_{DSF}$ of the dispersion-shifted optical fiber.

SUMMARY OF THE INVENTION

The inventors have studied conventional optical transmission lines in detail and, and as a result, have found problems as follows.

As compared with standard single-mode optical fibers, dispersion-shifted optical fibers have a greater ratio ($S_{DSF}/D_{DSF}$) at a wavelength of 1550 nm. Therefore, it is necessary for dispersion-compensating optical fibers for DSF to have a greater ratio ($S_{DSF}/D_{DSF}$) at the wavelength of 1550 nm as compared with dispersion-compensating optical fibers for SMF.

The dispersion-compensating optical fiber for SMF a disclosed in Japanese Patent Application Laid-Open. No. HEI 6-11620 compensates for the chromatic dispersion of a standard single-mode optical fiber having a zero-dispersion wavelength near a wavelength of 1.3 $\mu$m and a large chromatic dispersion at a wavelength of 1550 nm, and has a negative chromatic dispersion with a large absolute value. Therefore, this dispersion-compensating optical fiber for SMF is suitable for compensating for the chromatic dispersion of the standard single-mode optical fiber. However, this dispersion-compensating optical fiber for SMF is not sufficient for compensating for the dispersion slope.

On the other hand, the dispersion-compensating optical fiber for DSF disclosed in U.S. Pat. No. 5,838,867 can compensate for both of the chromatic dispersion and dispersion slope of a non-zero dispersion-shifted optical fiber having a small positive chromatic dispersion at a wavelength of 1550 nm. Since this dispersion-compensating optical fiber for DSF has a chromatic dispersion with a small absolute value, a long dispersion-compensating optical fiber for DSF is needed for compensating for both of the chromatic dispersion and dispersion slope of the non-zero dispersion-shifted optical fiber.

For example, the non-zero dispersion-shifted optical fiber disclosed in the document 1, S. Bigo, et al., "1.5 Terabit/s WDM transmission of 150 channels at 10 Gbit/s over 4×100 km of TeraLight™ fibre," ECOC'99, PD (1999), has a chromatic dispersion of +8 ps/nm/km and a dispersion slope of +0.06 ps/nm$^2$/km at a wavelength of 1550 nm. On the other hand, the non-zero dispersion-shifted optical fiber disclosed in the document 2, D. W. Peckham, et al., "Reduced dispersion slope, non-zero dispersion fiber, " ECOC'98, pp. 139–140 (1998), has a chromatic dispersion of +4 ps/nm/km and a dispersion slope of +0.046 ps/nm$^2$/km at a wavelength of 1550 nm. For compensating for both of the chromatic dispersion and dispersion slope of any of the non-zero dispersion-shifted optical fibers disclosed in these documents having a length of 80 km, a dispersion-compensating optical fiber for DSF having a length of 8 km to 16 km is necessary.

Meanwhile, even upon slight bending, fundamental-mode light is likely to leak out from dispersion-compensating optical fibers for DSF in general, so that bending loss is large in the fundamental-mode light. Consequently, transmission loss becomes greater when a dispersion-compensating optical fiber for DSF is laid as being cabled or is formed into a dispersion-compensating module as being wound like a coil. Therefore, in an optical transmission system which carries out optical communications by propagation of signals through an optical transmission line constructed by a dispersion-shifted optical fiber and a dispersion-compensating optical fiber for DSF which are connected to each other, transmission loss is so large in the optical transmission line that its repeater section cannot be elongated, whereby higher speed and larger capacity cannot further be achieved in optical communications.

In order to overcome the problems mentioned above, it is an object of the present invention to provide a dispersion-compensating optical fiber which can compensate for the chromatic dispersion and dispersion slope of a non-zero dispersion-shifted optical fiber by a short length, an optical transmission line with a low transmission loss including the dispersion-shifted optical fiber and dispersion-compensating optical fiber, and a dispersion-compensating module with a low transmission loss in which the dispersion-compensating optical fiber is wound like a coil.

The dispersion-compensating optical fiber according to the present invention has, at a wavelength of 1550 nm, a chromatic dispersion $D_{DCF}$ of −40 ps/nm/km or less and a ratio ($S_{DCF}/D_{DCF}$) of dispersion slope $S_{DCF}$ to the chromatic dispersion $D_{DCF}$ of 0.005/nm or more. By this structure, the occurrence of non-linear phenomenon can be effectively prevented because an effective area can be easily expand. Preferably, in the dispersion-compensating optical fiber according to the present invention, the chromatic dispersion $D_{DCF}$ is −100 ps/nm/km or more but −40 ps/nm/km or less, and the ratio ($S_{DCF}/D_{DCF}$) of dispersion slope $S_{DCF}$ to the chromatic dispersion $D_{DCF}$ is 0.005/nm or more but 0.015/nm or less. Since the chromatic dispersion $D_{DCF}$ is negative with a large absolute value, and the ratio ($S_{DCF}/D_{DCF}$) of dispersion slope $S_{DCF}$ to chromatic dispersion $D_{DCF}$ lies within the numerical range mentioned above, this dispersion-compensating optical fiber can compensate for the chromatic dispersion and dispersion slope of a dispersion-shifted optical fiber in a wide band including a wavelength of 1550 nm by a short length.

The dispersion-compensating optical fiber according to the present invention preferably has an effective area of 16 $\mu m^2$, more preferably 20 $\mu m^2$ or more at the wavelength of 1550 nm. In this case, it can restrain four-wave mixing from occurring and suppress deterioration in the waveforms of light signals propagating therethrough.

The dispersion-compensating optical fiber according to the present invention preferably has a cutoff wavelength of 1.2 $\mu m$ or more but 1.8 $\mu m$ or less, more preferably 1.4 $\mu m$ or more but 1.8 $\mu m$ or less. Also, the dispersion-compensating optical fiber according to the present invention preferably has a transmission loss of 0.5 dB/km or less at a wavelength of 1550 nm. In this case, bending loss can be restrained from increasing since the cutoff wavelength is longer than that, conventionally obtained, and lower loss is attained even when the optical fiber is formed into a cable or module, since the transmission loss lies within the numerical range mentioned above as well.

The dispersion-shifted optical fiber according to the present invention preferably has a core region extending along a predetermined axis and having a first refractive index, and a cladding region surrounding around the outer periphery of the core region. The cladding region includes a first cladding surrounding around the outer periphery of the core region and having a second refractive index lower than the first refractive index, a second cladding surrounding around the outer periphery of the first cladding and having a third refractive index higher than the second refractive index, and a third cladding surrounding around the outer periphery of the second cladding and having a fourth refractive index lower than the third refractive index. The core region preferably has a relative refractive index difference 0.8% or more but 2.0% or less, more preferably 0.8% or more but 1.5% or less, with reference to the fourth refractive index of the third cladding. The first cladding preferably has a relative refractive index difference of −0.4% or lower with reference to the fourth refractive index of the third cladding. These cases are suitable for realizing a dispersion-compensating optical fiber having the above-mentioned characteristics.

In the dispersion-compensating optical fiber according to the present invention, the ratio ($S_{DCF}/D_{DCF}$) preferably changes by 10% or less when the outside diameter of the second cladding changes by 2%. In this case, a dispersion-compensating optical fiber having a desirable chromatic dispersion characteristic can be made easily.

On the other hand, for reduction of a transmission loss and fiber non-linearity by shortening a fiber length, the dispersion-compensating optical fiber according to the present invention preferably has the chromatic dispersion $D_{DCF}$ is −250 ps/nm/km or more but −120 ps/nm/km or less, the ratio ($S_{DCF}/D_{DCF}$) of dispersion slope $S_{DCF}$ to the chromatic dispersion $D_{DCF}$ is 0.005/nm or more, and an effective area of 10 $\mu m^2$ or more but 20 $\mu m^2$ or less, more preferably (20−|$D_{DCF}$|/25) or more but (23−|$D_{DCF}$|/25) or less. Because it is necessary to reduce a size of the effective area at a bending weak portion where an absolute value of dispersion becomes large. Also, the dispersion-compensating optical fiber preferably has a transmission of 1.0 dB/km or less. As described above, the dispersion-compensating optical fiber has the core region, and the cladding region including the first to third cladding. And, it is preferably that a relative refractive index difference of the core region with respect to the third cladding is 2.0% or more but 3.0% or less, and that a relative refractive index difference of the first cladding with respect to the third cladding is −0.4% or less.

The optical transmission line according to the present invention has a repeater section laid with the above-mentioned dispersion-compensating optical fiber; and a dispersion-shifted optical fiber fusion-spliced to the dispersion-compensating optical fiber. The dispersion-shifted optical fiber has, at a wavelength of 1550 nm, a chromatic dispersion of +2 ps/nm/km or more but +10 ps/nm/km or less, and a dispersion slope of +0.04 ps/nm²/km or more but +0.12 ps/nm²/km or less. When the dispersion-shifted optical fiber and the dispersion-compensating optical fiber are connected to each other with an appropriate length ratio, thus formed optical transmission line yields, on the whole, an average chromatic dispersion with a small absolute value and an average dispersion slope with a small absolute value at the wavelength of 1550 nm. As a consequence, this optical transmission line has, on the whole, an average chromatic dispersion with a small absolute value and a small average transmission loss in a wide wavelength band including a wavelength of 1550 nm.

The optical transmission line according to the present invention preferably has, on the whole, an average chromatic dispersion with a deviation (=maximum value–minimum value) of 0.2 ps/nm/km or less in a wavelength band of 1535 nm or more but 1560 nm or less (C band). More preferably, the average chromatic dispersion on the whole has a deviation of 0.2 ps/nm/km or less in a wavelength band of 1535 nm or more but 1600 nm or less (C and L bands). In an optical transmission system which carries out optical communications by making signals propagate through such an optical transmission line in this case, the optical transmission line yields a low average transmission loss, the average chromatic dispersion has a small absolute value, and optical transmission with a high bit rate is possible in a wide wavelength band (including at least the C band and further the L band) including the wavelength of 1550 nm. Therefore, this optical transmission system can elongate the repeater section and achieve further higher speed and larger capacity in optical communications.

The dispersion-compensating module according to the present invention is characterized in that the above-mentioned dispersion-compensating optical fiber is wound like a coil so as to form a module. The dispersion-compensating module in which the dispersion-compensating optical fiber is formed into a module compensates for the chromatic dispersion and dispersion slope of a dispersion-shifted optical fiber laid in a repeater section, and yields, on the whole, an average chromatic dispersion with a small absolute value and an average dispersion slope with a small absolute value at a wavelength of 1550 nm when the dispersion-shifted optical fiber and dispersion-compensating optical fiber have an appropriate length ratio therebetween. As a consequence, the whole of the dispersion-shifted optical fiber and dispersion-compensating module have an average chromatic dispersion with a smaller absolute value and a small average transmission loss in a wide wavelength band including the wavelength of 1550 nm.

The dispersion-compensating module according to the present invention preferably has a total loss of 7 dB or less in a wavelength band of 1535 nm or more but 1565 nm or less, more preferably a total loss of 7 dB or less in a wavelength band of 1535 nm or more but 1610 nm or less, when yielding a dispersion-compensating amount of –640 ps/nm at the wavelength of 1550 nm. In the dispersion-compensating module according to the present invention, the total loss is preferably 3 dB or less in the wavelength band of 1535 nm or more but 1565 nm or less, more preferably 3 dB or less in the wavelength band of 1535 nm or more but 1610 nm or less, when the dispersion-compensating amount is –320 ps/nm at the wavelength of 1550 nm. In an optical transmission system having this dispersion-compensating module, its average transmission loss is small, its average chromatic dispersion has a small absolute value, and optical transmission with a high bit rate is possible in a wide wavelength band (wavelength band including at least the C band and further the L band) including the wavelength of 1550 nm. As a consequence, this optical transmission system can elongate the repeater section and achieve further higher speed and larger capacity in optical communications.

Further, the dispersion-compensating optical fiber according to the present invention preferably has, at a wavelength of 1550 nm, a chromatic dispersion $D_{DCF}$ of –40 ps/nm/km or less, a ratio ($S_{DCF}/D_{DCF}$) of dispersion slope $S_{DCF}$ to the chromatic dispersion $D_{DCF}$ of 0.005/nm or more, and an effective area of 16 $\mu m^2$ or more, more preferably 20 $\mu m^2$ or more. In a wide wavelength band including a wavelength of 1550 nm, this dispersion-compensating optical fiber not only can compensate for the chromatic dispersion and dispersion slope of a dispersion-shifted optical fiber by a short length, but also can restrain four-wave mixing from occurring and suppress deterioration in the waveforms of light signals propagating therethrough.

Still further, the dispersion-compensating optical fiber according to the present invention preferably has, at a wavelength of 1550 nm, a chromatic dispersion $D_{DCF}$ of –40 ps/nm/km or less, a ratio ($S_{DCF}/D_{DCF}$) of dispersion slope $S_{DCF}$ to the chromatic dispersion $D_{DCF}$ of 0.005/nm or more, and a transmission loss of 0.5 dB/km or less. This dispersion-compensating optical fiber not only can compensate for the chromatic dispersion and dispersion slope of a dispersion-shifted optical fiber by a short length, but also yields a low loss even when formed into a cable or module.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, modes for carrying out the present invention will be explained in detail with reference to the accompanying drawings. In the explanation of the drawings, constituents identical to each other will be referred to with numerals identical to each other without repeating their overlapping descriptions.

Figure 1:
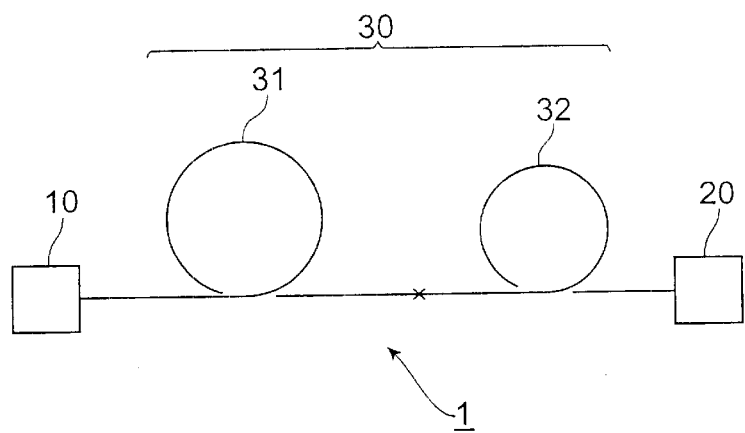
FIG. 1 is a view showing a schematic structure of an optical transmission system including an optical transmission line according to the present invention.

FIG. 1 is a view showing a schematic structure of an optical transmission system including an optical transmission line 30 according to the present invention. In this optical transmission system 1, the optical transmission line 30 is laid in a repeater section between a station (transmitter station or repeater station) 10 and a station (receiver station or repeater station) 20. The optical transmission line 30 is constructed by a dispersion-shifted optical fiber 31 and a dispersion-compensating optical fiber 32 which are fusion-spliced to each other. In this optical transmission system 1, signals having a plurality of wavelengths in a 1.55-$\mu$m wavelength band sent out from the station 10 reaches the station 20 byway of the dispersion-shifted optical fiber 31 and dispersion-compensating optical fiber 32 in succession, and is received by the station 20 or is optically amplified by the station 20 so as to be further sent out to the downstream thereof.

The dispersion-shifted optical fiber 31 is a silica-based optical fiber having a small positive chromatic dispersion at a wavelength of 1550 nm. In the dispersion-shifted optical fiber 31, at the wavelength of 1550 nm, chromatic dispersion $D_{DSF}$ is +2 ps/nm/km to +10 ps/nm/km, dispersion slope $S_{DSF}$ is +0.04 ps/nm$^2$/km to +0.12 ps/nm$^2$/km, and transmission loss is about 0.20 dB/km.

The dispersion-compensating optical fiber 32 according to the present invention is a silica-based optical fiber which compensates for the chromatic dispersion and dispersion slope of the dispersion-shifted optical fiber 31 at the wavelength of 1550 nm. In the dispersion-compensating optical fiber 32, at the wavelength of 1550 nm, its chromatic dispersion $D_{DCF}$ is –40 ps/nm/km or less, and the ratio ($S_{DCF}/D_{DCF}$) of dispersion slope $S_{DCF}$ to the chromatic dispersion $D_{DCF}$ is 0.005/nm or more. Preferably, in the dispersion-compensating optical fiber 32, at the wavelength of 1550 nm, the chromatic dispersion $D_{DCF}$ is –100 ps/nm/km to –40 ps/nm/km, and the ratio ($S_{DCF}/D_{DCF}$) of dispersion slope $S_{DCF}$ to the chromatic dispersion $D_{DCF}$ is 0.005/nm to 0.015/nm. Also, the dispersion-compensating optical fiber 32 has an effective area of 16 $\mu$m$^2$ or more preferably 20 cm or more at the wavelength of 1550 nm, a cutoff wavelength of 1.2 $\mu$m to 1.8 $\mu$m, preferably 1.4 $\mu$m to 1.8 $\mu$m, and a transmission loss of 0.5 dB/km or less at the wavelength of 1550 nm.

Further, the dispersion-compensating optical fiber 32 may have, at the wavelength of 1550 nm, the chromatic dispersion $D_{DCF}$ is –250 ps/nm/km to –120 ps/nm/km, the ratio ($S_{DCF}/D_{DCF}$) of dispersion slope $S_{DCF}$ to the chromatic dispersion $D_{DCF}$ is 0.005/nm or more, and an effective area of 10 $\mu$m$^2$ to 20 $\mu$m at the wavelength of 1550 nm. Also, the dispersion-compensating optical fiber has a cutoff wavelength of 1.2 $\mu$m to 1.8 $\mu$m, preferably 1.4 $\mu$m to 1.8 $\mu$m, and a transmission loss of 1.0 dB/km or less at the wavelength of 1550 nm.

Since the chromatic dispersion $D_{DCF}$ and dispersion slope $S_{DCF}$ lie within their numerical ranges mentioned above, the dispersion-compensating optical fiber 32 having such characteristics can compensate for the chromatic dispersion and dispersion slope of the dispersion-shifted optical fiber 31 in a wide band including the wavelength of 1550 nm by a short length. Also, since the dispersion-compensating optical fiber 32 has a chromatic dispersion within the numerical range thereof mentioned above and a sufficient effective area, it can restrain four-wave mixing from occurring and suppress deterioration in the waveforms of signals propagating therethrough. Further, in the dispersion-compensating optical fiber 32, bending loss can be restrained from increasing since the cutoff wavelength lies within its numerical range mentioned above, and the optical transmission line 30 attains a lower loss even when formed into a cable, since the transmission loss lies within the numerical range thereof mentioned above as well.

The optical transmission line 30 in which the dispersion-shifted optical fiber 31 and the dispersion-compensating optical fiber 32 are fusion-spliced to each other at an appropriate length ratio has, on the whole, an average chromatic dispersion with a small absolute value and an average dispersion slope with a small absolute value at the wavelength of 1550 nm. As a consequence, the optical transmission line 30 has, on the whole, an average chromatic dispersion with a smaller absolute value in a wide band including the wavelength of 1550 nm. Also, the optical transmission line 30 has a small average transmission loss as a whole. The deviation of the average chromatic dispersion of the whole optical transmission line 30 is preferably 0.2 ps/nm/km or less in a wavelength band of 1535 nm to 1560 nm (C band), more preferably 0.2 ps/nm/km or less in a wavelength band of 1535 nm to 1600 nm (C and L bands). In the optical transmission system 1, which carries out optical communications by making signals propagating through the optical transmission line 30, the average transmission loss of the optical transmission line 30 is small, the absolute value of average chromatic dispersion is small, and optical transmission with a high bit rate is possible in a wide wavelength band (including at least the C band and further the L band) including the wavelength of 1550 nm. Therefore, the optical transmission system 1 can elongate the repeater section and achieve further higher speed and larger capacity in optical communications.

Figure 2:
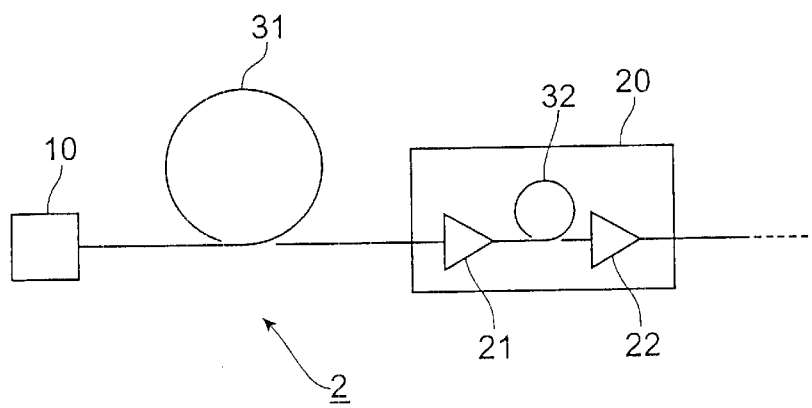
FIG. 2 is a view showing a schematic structure of an optical transmission system in which a dispersion-shifted optical fiber is laid as an optical transmission line, and a dispersion-compensating optical fiber is disposed as a dispersion-compensating module within a station.

FIG. 2 is a view showing a schematic structure of an optical transmission system 2 in which a dispersion-shifted optical fiber 31 is laid as an optical transmission line, and a dispersing-compensating optical fiber 32 is disposed as a dispersion-compensating module within a station 20. In this optical transmission system 2, the dispersion-shifted optical fiber 31 is laid as an optical transmission line in a repeater section between a station (transmitter station or repeater station) 10 and the station (receiver station or repeater station) 20. In the optical transmission system 2, signals having a plurality of wavelengths in a 1.55-μm wavelength band sent out from the station 10 reach the station 20 by way of the dispersion-shifted optical fiber 31 acting as the optical transmission line. In the station 20, the signals are optically amplified by an optical amplifier 21, their dispersion is compensated for by the dispersion-compensating optical fiber 32, and the signals are optically amplified by an optical amplifier 22 and then is received or further sent out to the downstream thereof.

The dispersion-shifted optical fiber 31 employed as an optical transmission line in the optical transmission system 2 of FIG. 2 has characteristics similar to those of the dispersion-shifted optical fiber 31 used as a part of the optical transmission line in the optical transmission system 1 of FIG. 1. Also, the dispersion-compensating optical fiber 32 employed as a dispersion-compensating module in the optical transmission system 2 of FIG. 2 has characteristics similar to those of the dispersion-compensating module 32 used as a part of the optical transmission line in the optical transmission system 1 of FIG. 1. In the optical transmission system 2 shown in FIG. 2, however, the dispersion-compensating optical fiber 32 is disposed within the station 20 as being wound like a coil about a bobbin so as to form a module.

Since the chromatic dispersion $D_{DCF}$ and dispersion slope $S_{DCF}$ lie within their numerical ranges mentioned above, the dispersion-compensating optical fiber 32 having the above-mentioned characteristics can compensate for the chromatic dispersion and dispersion slope of the dispersion-shifted optical fiber 31 in a wide band including the wavelength of 1550 nm by a short length. Also, since the dispersion-compensating optical fiber 32 has a chromatic dispersion within the numerical range thereof mentioned above and a sufficient effective area, it can restrain four-wave mixing from occurring and suppress deterioration in the waveforms of signals propagating therethrough. Further, the dispersion-compensating optical fiber 32 can restrain bending loss from increasing since the cutoff wavelength lies within its numerical range mentioned above, and attains a lower loss even when formed into a module, since the transmission loss lies within the numerical range thereof mentioned above as well.

The whole of the dispersion-shifted optical fiber 31 as an optical transmission line and the dispersion-compensating optical fiber 32 as a dispersion-compensating module has, on the whole, an average chromatic dispersion with a small absolute value and an average dispersion slope with a small absolute value at the wavelength of 1550 nm when they have their respective appropriate lengths. As a consequence, the whole of the dispersion-shifted optical fiber 31 and dispersion-compensating optical fiber 32 has an average chromatic dispersion with a smaller absolute value in a wide band including the wavelength of 1550 nm, and a small average transmission loss. The deviation of their total average chromatic dispersion is preferably 0.2 ps/nm/km or less in the wavelength band of 1535 nm to 1560 nm (C band), more preferably 0.2 ps/nm/km or less in the wavelength band of 1535 nm to 1600 nm (C and L bands).

On the other hand, the dispersion-compensating optical fiber 32 as a dispersion-compensating module preferably has a total loss of 7 dB or less in the wavelength band of 1535 nm to 1565 nm (C band), more preferably a total loss of 7 dB or less in the wavelength band of 1535 nm to 1610 nm (C and L bands), when yielding a dispersion-compensating amount of −640 ps/nm at the wavelength of 1550 nm. Also, the dispersion-compensating optical fiber 32 as a dispersion-compensating module preferably has a total loss of 3 db or less in the wavelength band of 1535 nm to 1565 nm (C band), more preferably a total loss of 3 db or less in the wavelength band of 1535 nm to 1610 nm (C and L bands), when yielding a dispersion-compensating amount of −320 ps/nm at the wavelength of 1550 nm.

In the optical transmission system 2, the average transmission loss is small, the absolute value of average chromatic dispersion is small, and optical transmission with a high bit rate is possible in a wide wavelength band (including at least the C band and further the L band) including the wavelength of 1550 nm. Therefore, the optical transmission system 2 can elongate the repeater section and achieve further higher speed and larger capacity in optical communications.

Figure 3A:
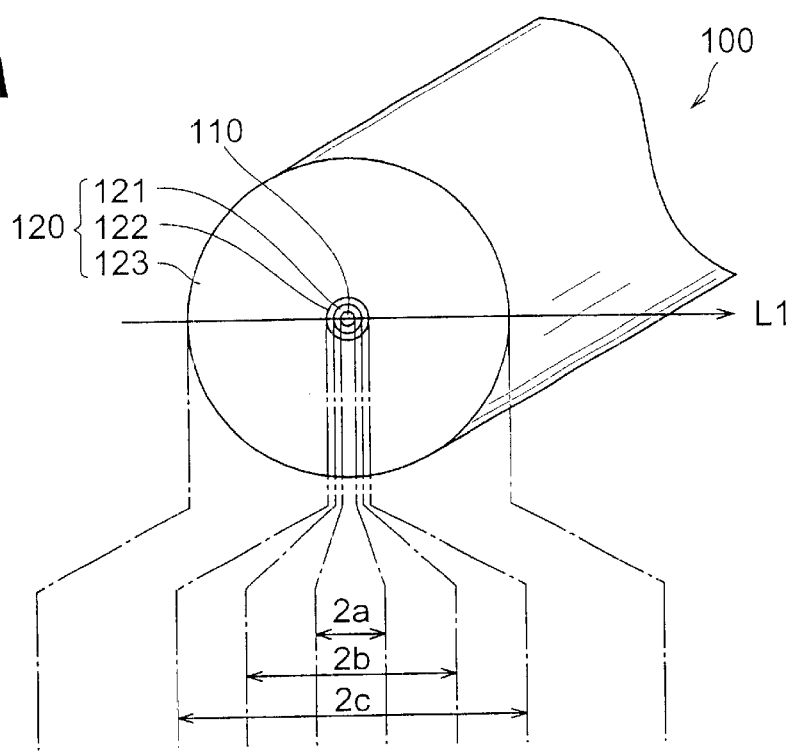
FIGS. 3A and 3B are views showing a cross-sectional structure of the dispersion-compensating optical fiber according to the present invention and its refractive index profile, respectively.
Figure 3B:
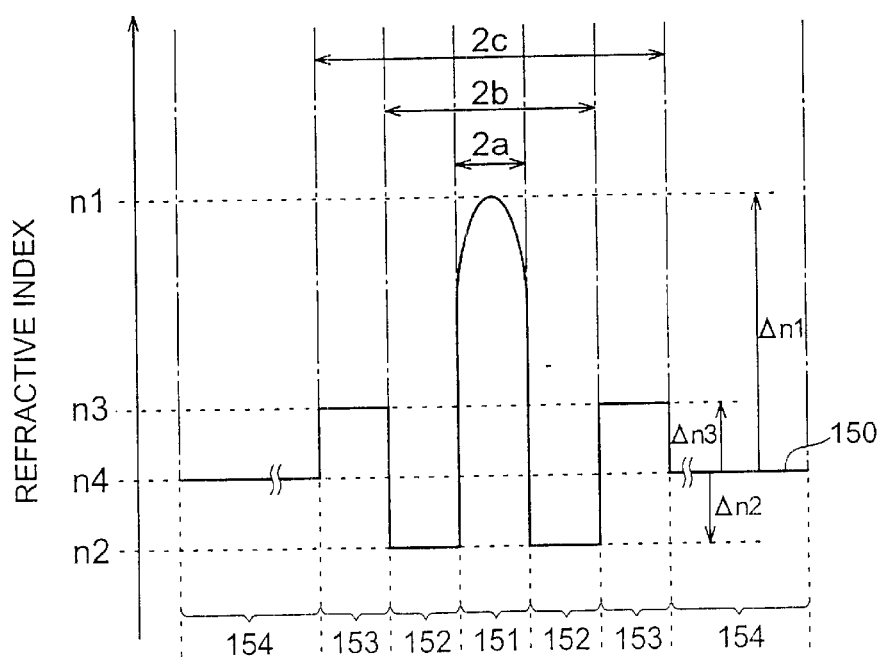

FIGS. 3A and 3B are views showing a cross-sectional structure of a dispersion-compensating optical fiber according to the present invention and its refractive index profile, respectively.

The optical fiber 100 shown in FIG. 3A corresponds to the dispersion-compensating optical fiber 32, and comprises a core region 110 extending along a predetermined axis and a cladding region 120 provided so as to surround the outer periphery of the core region 110. The core region 110 has a refractive index $n_1$ and an outer diameter of $2a$. Further, the cladding region 120 comprises a first cladding 121 having a second refractive index $n_2$ ($<n_1$) and an outside diameter $2b$, a second cladding 122 provided so as to surround the outer periphery of the first cladding 121, having a third refractive index $n_3$ ($>n_2$, $<n_1$) and an outside diameter $2c$, and a third cladding 123 provided so as to surround the outer periphery of the second cladding 122, having a fourth refractive index $n_4$ ($<n_3$, $>n_2$).

The refractive index profile 150 shown in FIG. 3B indicates respective refractive indices at individual parts on the line L1 in FIG. 3A, such that areas 151, 152, 153, and 154 in the refractive index profile 150 represent refractive indices of individual parts on the line L1 in the core region 110, first cladding 121, second cladding 122, and third cladding 123, respectively.

In the dispersion-compensating optical fiber 100 of FIGS. 3A and 3B, with respect to the third cladding 123 acting as a reference region, the relative refractive index difference $\Delta n_1$ of the core region 110, the relative refractive index difference $\Delta n_2$ Of first cladding 121, and the relative refractive index difference $\Delta n_3$ of second cladding 122 are given by the following respective expressions:

$$\Delta n_1 = (n_1 - n_4)/n_4$$

$$\Delta n_2 = (n_2 - n_4)/n_4$$

$$\Delta n_3 = (n_3 - n_4)/n_4$$

where $n_1$ is the refractive index of the core region 110, $n_2$ is the refractive index of the first cladding 121, $n_3$ is the refractive index of the second cladding 122, and $n_4$ is the refractive index of the third cladding 123 acting as the reference region. In this specification, the relative refractive index difference of each part is expressed in terms of percentage, and individual parameters in the above-mentioned expressions may be placed in the fixed order. Therefore, the relative refractive index difference of a glass region having a refractive index lower than that of the third cladding 123 (reference region) is expressed by a negative value.

Here, in the dispersion-compensating optical fiber 100, with reference to the refractive index $n_4$ of the third cladding 123, the core region 110 has a relative refractive index difference $\Delta n_1$ of 0.8% to 2.0%, more preferably 0.8% to 1.5%, the first cladding 121 has a relative refractive index difference $\Delta n_2$ of −0.4% or lower.

Since the dispersion-compensating optical fiber 100 has such a refractive index profile, its chromatic dispersion $D_{DCF}$, ratio $(S_{DCF}/D_{DCF})$, effective area, cutoff wavelength, and transmission loss lie within the respective numerical ranges mentioned above. For the dispersion-compensating optical fiber 100 having such a refractive index profile, it is preferred that silica glass be employed as a base, its core region 110 be doped with $GeO_2$, its first cladding 121 be doped with F element, and its second cladding 122 be doped with $GeO_2$. As a consequence, the refractive index profile shown in FIG. 3B can be realized, and the transmission loss of the dispersion-compensating optical fiber 100 at the wavelength of 1550 nm can be lowered.

Next, embodiments of the dispersion-compensating optical fiber 32 according to the present invention will now be explained. Each of the dispersion-compensating optical fibers DCF1–DCF7 respectively according to a first to seventh embodiments, which will be explained in the following, has a sectional-structure of FIG. 3A and a refractive index profile 150 of FIG. 3B.

First Embodiment

In the dispersion-compensating optical fiber DCF1 according to the first embodiment, with respect to the third cladding 123, the relative refractive index difference $\Delta n_1$ of the core region 110 was 1.2%, the relative refractive index difference $\Delta n_2$ of the first cladding 121 was −0.50%, the relative refractive index difference $\Delta n_3$ of the second cladding 122 was 0.20%, the ratio ($2a/2c$) of the respective outside diameters of the core region 110 and second cladding 122 was 0.30, and the ratio ($2b/2c$) of the respective outside diameters of the first cladding 121 and second cladding 122 was 0.60. When the outside diameter $2c$ of the second cladding 122 was 17.7 μm, at the wavelength of 1550 nm, the dispersion-compensating optical fiber DCF1 of the first embodiment exhibited a chromatic dispersion $D_{DCF}$ of 62.4 ps/nm/km, a dispersion slope $S_{DCF}$ of 0.44 ps/nm²/km, an effective area of 24.4 μm², a bending loss of 10 dB/m at a bending diameter of 20 mm, and a transmission loss of 0.30 dB/km. Also, its cutoff wavelength was 1224 nm, and the ratio $(S_{DCF}/D_{DCF})$ at the wavelength of 1550 nm was 0.0071/nm.

Second Embodiment

In the dispersion-compensating optical fiber DCF2 according to the second embodiment, with respect to the third cladding 123, the relative refractive index difference $\Delta n_1$ of the core region 110 was 1.3%, the relative refractive index difference $\Delta n_2$ of the first cladding 121 was −0.50%, the relative refractive index difference $\Delta n_3$ of the second cladding 122 was 0.23%, the ratio ($2a/2c$) of the respective outside diameters of the core region 110 and second cladding 122 was 0.27, and the ratio ($2b/2c$) of the respective outside diameters of the first cladding 121 and second cladding 122 was 0.55. When the outside diameter $2c$ of the second cladding 122 was 19.0 μm, at the wavelength of 1550 nm, the dispersion-compensating optical fiber DCF2 of the second embodiment exhibited a chromatic dispersion $D_{DCF}$ of −80.4 ps/nm/km, a dispersion slope $S_{DCF}$ of −0.59 ps/nm²/km, an effective area of 23.9 μm², a bending loss of 4 dB/m at a bending diameter of 20 mm, a transmission loss of 0.33 db/km. Also, its cutoff wavelength was 1576 nm, and the ratio $(S_{DCF}/D_{DCF})$ at the wavelength of 1550 nm was 0.0073/nm.

Third Embodiment

In the dispersion-compensating optical fiber DCF3 according to the third embodiment, with respect to the third cladding 123, the relative refractive index difference $\Delta n_1$ of the core region 110 was 1.7%, the relative refractive index difference $\Delta n_2$ of the first cladding 121 was −0.50%, the relative refractive index difference $\Delta n_3$ of the second cladding 122 was 0.25%, the ratio ($2a/2c$) of the respective outside diameters of the core region 110 and second cladding 122 was 0.23, and the ratio ($2b/2c$) of the respective outside diameters of the first cladding 121 and second cladding 122 was 0.53. When the outside diameter $2c$ of the second cladding 122 was 18.7 μm, at the wavelength of 1550 nm, the dispersion-compensating optical fiber DCF3 of the third embodiment exhibited a chromatic dispersion $D_{DCF}$ of −83.7 ps/nm/km, a dispersion slope $S_{DCF}$ of −0.66 ps/nm²/km, an effective area of 17.2 μm², a bending loss of 0.2 dB/m at a bending diameter of 20 mm, a transmission loss of 0.39 dB/km. Also, its cutoff wavelength was 1696 nm, and the ratio $(S_{DCF}/D_{DCF})$ at the wavelength of 1550 nm was 0.0079/nm.

Figure 4:
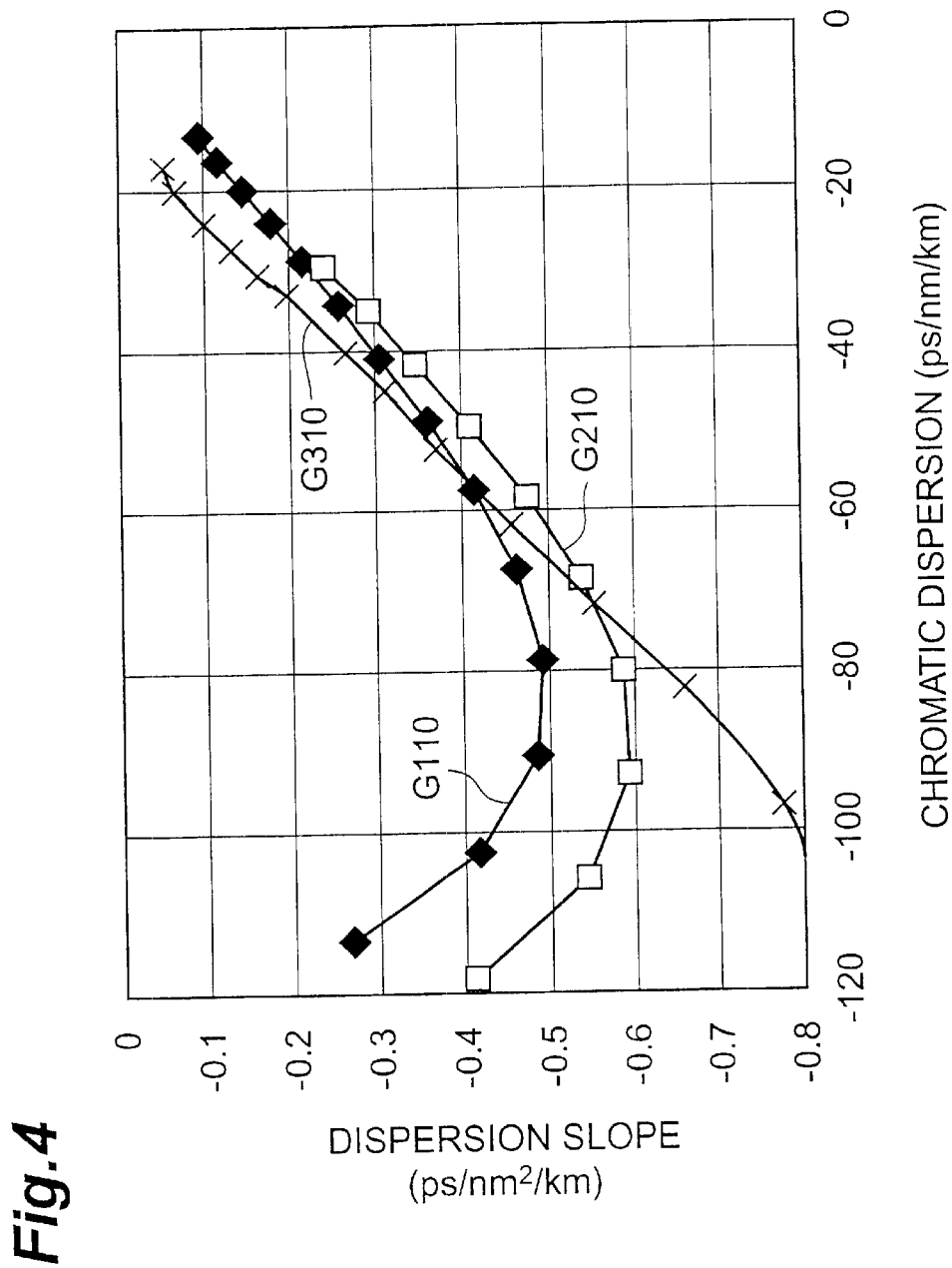
FIG. 4 is a graph showing the relationship between chromatic dispersion and dispersion slope of the dispersion-compensating optical fibers according to the first to third embodiments at the wavelength of 1550 nm.

FIG. 4 is a graph showing a relationship between chromatic dispersion and dispersion slope in each dispersion-compensating optical fiber of the first to third embodiments at the wavelength of 1550 nm. In FIG. 4, G110 indicates a curve for the first embodiment, G210 indicates a curve for the second embodiment, and G310 indicates a curve for the third embodiment. Shown here is the relationship between chromatic dispersion, $D_{DCF}$ and dispersion slope $S_{DCF}$ in each dispersion-compensating optical fiber of these embodiments when the outside diameter $2c$ of the second cladding 122 is changed. As can be seen from the graph of FIG. 4, the change in the ratio $(S_{DCF}/D_{DCF})$ of dispersion slope $S_{DCF}$ to the chromatic dispersion $D_{DCF}$ is small in each of the dispersion-compensating optical fibers DCF1 to DCF3 if the chromatic dispersion $D_{DCF}$ is approximately within the range of −60 ps/nm/km to, −10 ps/nm/km even when the outside diameter $2c$ of the second cladding 122 changes. In the dispersion-compensating optical fiber DCF1 of the first embodiment, the ratio $(S_{DCF}/D_{DCF})$ changes by 2.5% or less when the outside diameter $2c$ of the second cladding 122 changes by 2%, and further the range of the chromatic dispersion $D_{DCF}$ where the ratio $(S_{DCF}/D_{DCF})$ is kept to be 10% or less is −68 ps/nm/km to −17 ps/nm/km. In the dispersion-compensating optical fiber DCF2 of the second embodiment, the ratio $(S_{DCF}/D_{DCF})$ changes by 9.0% or less when the outside diameter 2c of the second cladding 122 changes by 2%, and further the range of the chromatic dispersion $D_{DCF}$ where the ratio $(S_{DCF}/D_{DCF})$ is kept to be 10% or less is −81 ps/nm/km to −30 ps/nm/km. In the dispersion-compensating optical fiber DCF3 of the third embodiment, the ratio $(S_{DCF}/D_{DCF})$ changes by 4.0% or less when the outside diameter 2c of the second cladding 122 changes by 2%, and further the range of the chromatic dispersion $D_{DCF}$ where the ratio $(S_{DCF}/D_{DCF})$ is kept to be 10% or less is −115 ps/nm/km to −62 ps/nm/km. If the change in ratio $(S_{DCF}/D_{DCF})$ is 10% or less when the outside diameter 2c of the second cladding 122 changes by 2% as such, then a dispersion-compensating optical fiber having a desirable chromatic dispersion characteristic can easily be made.

Figure 5:
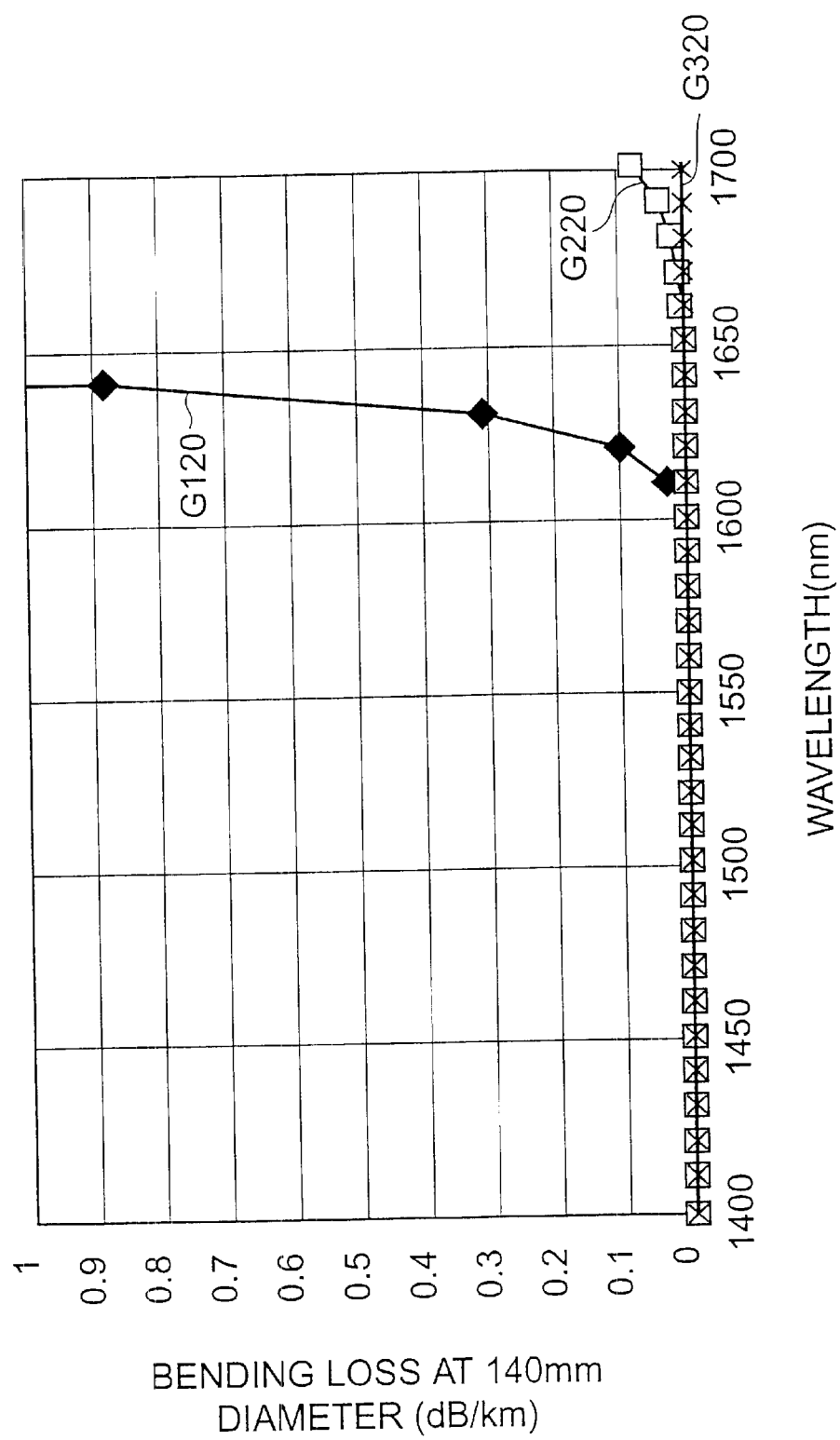
FIG. 5 is a graph showing the wavelength dependence of bending loss at a bending diameter of 140 mm of the dispersion-compensating optical fibers according to the first to third embodiments.

FIG. 5 is a graph showing the wavelength dependence of bending loss in each dispersion-compensating optical fiber of the first to third embodiments at a bending diameter of 140 mm. In FIG. 5, G120 indicates a curve for the first embodiment, G220 indicates a curve for the second embodiment, and G320 indicates a curve for the third embodiment. The outside diameter 2c of the second cladding 122 in the dispersion-compensating optical fiber DCF1 of the first embodiment was 17.7 μm, the outside diameter 2c of the second cladding 122 in the dispersion-compensating optical fiber DCF2 of the second embodiment was 19.0 μm, and the outside diameter 2c of the second cladding 122 in the dispersion-compensating optical fiber DCF3 of the third embodiment was 18.7 μm. As can be seen from the graph of FIG. 5, each of the dispersion-compensating optical fibers DCF1 to DCF3 has a low bending loss in the range where wavelength is 1610 nm or shorter.

Therefore, each of the dispersion-compensating optical fibers DCF1 to DCF3 is not only suitably employable as the dispersion-compensating optical fiber 32 constituting a part of the optical transmission line 30 in the optical transmission system 1 shown in FIG. 1, but also is suitably employable as the dispersion-compensating optical fiber 32 forming a dispersion-compensating module in the optical transmission system 2 shown in FIG. 2, thereby being able to compensate for chromatic dispersion not only in the C band but also in the L band with a low loss.

Figure 6:
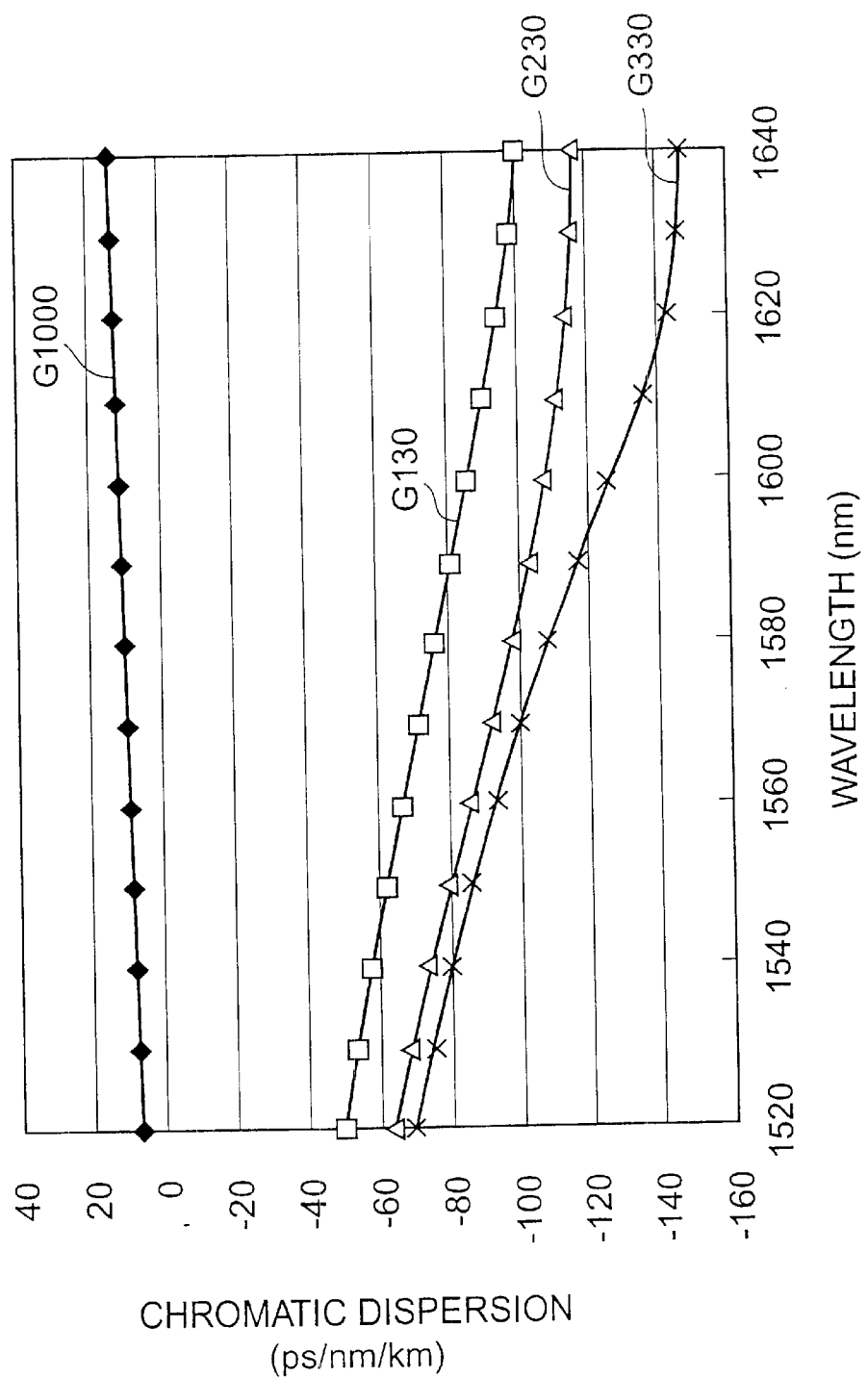
FIG. 6 is a graph showing the wavelength dependence of chromatic dispersion of the dispersion-compensating optical fibers according to the first to third embodiments.

FIG. 6 is a graph showing the wavelength dependence of chromatic dispersion in each dispersion-compensating optical fiber of the first to third embodiments. In FIG. 6, G130 indicates a curve for the first embodiment, G230 indicates a curve for the second embodiment, G330 indicates a curve for the third embodiment, and G1000 indicates a curve for a non-zero dispersion-shifted optical fiber NZDSF disclosed in the above-mentioned document 1. Here, the outside diameter 2c of the second cladding 122 in the dispersion-compensating optical fiber DCF1 of the first embodiment was 17.7 μm, the outside diameter 2c of the second cladding 122 in the dispersion-compensating optical fiber DCF2 of the second embodiment was 19.0 μm, and the outside diameter 2c of the second cladding 122 in the dispersion-compensating optical fiber DCF3 of the third embodiment was 18.7 μm, too.

Figure 7:
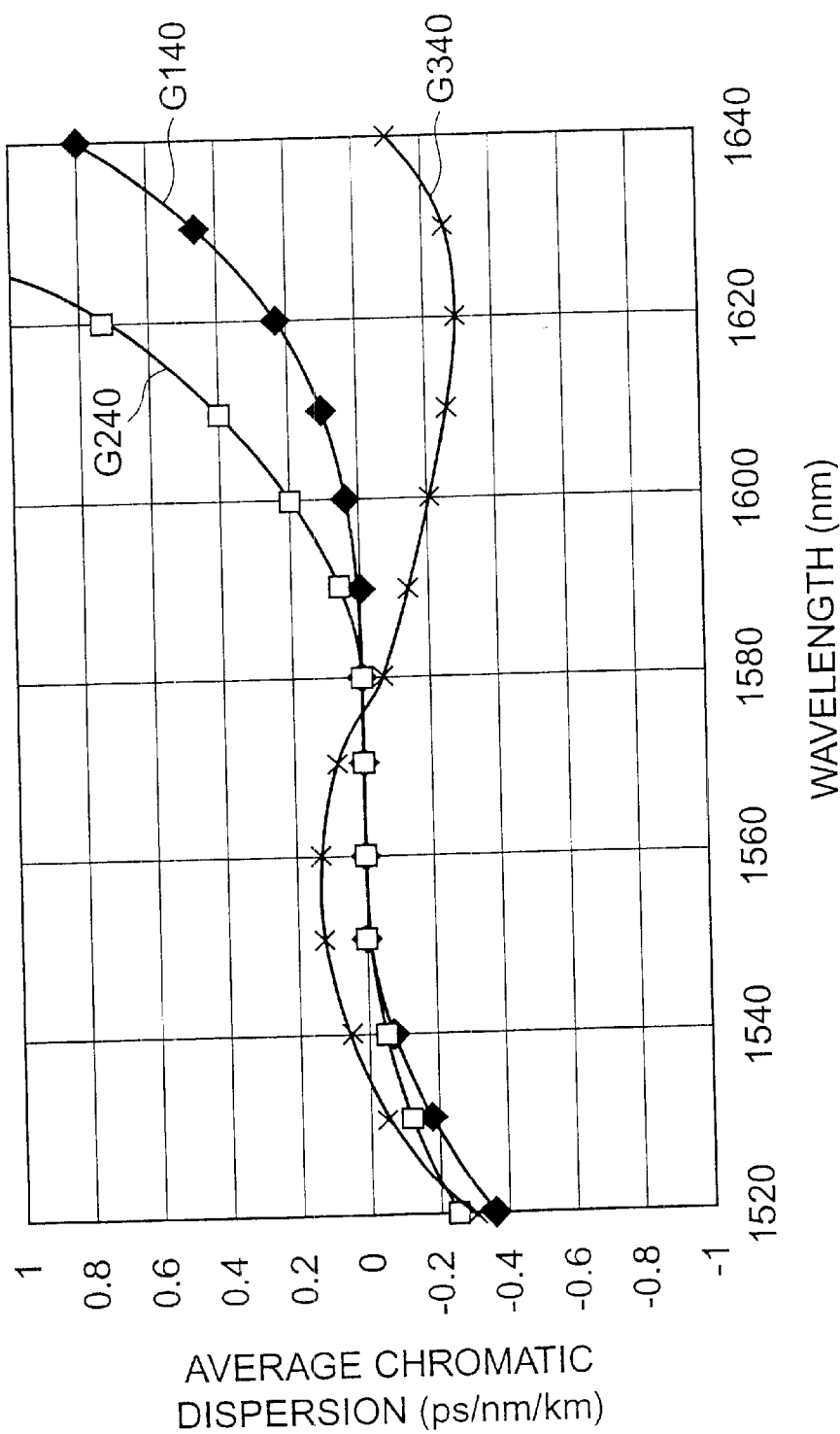
FIG. 7 is a graph showing the wavelength dependence of average chromatic dispersion on the whole of each assembly in which the dispersion-compensating optical fiber according to each of the first to third embodiments and a dispersion-shifted optical fiber are fusion-spliced to each other.

FIG. 7 is a graph showing the wavelength dependence of the average chromatic dispersion on the whole, in each assembly made by each dispersion-compensating optical fiber of the first to third embodiments and the dispersion-shifted optical fiber connected to each other. In FIG. 7, G140 indicates a curve for the assembly in which the dispersion-compensating optical fiber DCF1 of the first embodiment and the dispersion-shifted optical fiber NZDSF of FIG. 6 were connected to each other, G240 indicates a curve for the assembly in which the dispersion-compensating optical fiber DCF2 of the second embodiment and the dispersion-shifted optical fiber NZDSF of FIG. 6 were connected to each other, and G340 indicates a curve for the assembly in which the dispersion-compensating optical fiber DCF3 of the third embodiment and the dispersion-shifted optical fiber NZDSF of FIG. 6 were connected to each other. For compensating for the chromatic dispersion at the wavelength of 1550 nm of the dispersion-shifted optical fiber NZDSF having the chromatic dispersion characteristic shown in FIG. 6 and a length of 80 km, a length of 10.3 km was necessary for the dispersion-compensating optical fiber DCF1 of the first embodiment, a length of 8.0 km was necessary for the dispersion-compensating optical fiber DCF2 of the second embodiment, and a length of 7.5 km was necessary for the dispersion-compensating optical fiber DCF3 of the third embodiment.

In the assembly in which the dispersion-compensating optical fiber DSF1 of the first embodiment and the dispersion-shifted optical fiber NZDSF were connected to each other, the total average chromatic dispersion had a deviation of 0.2 ps/nm/km or less in a wavelength band of 1535 nm to 1600 nm (C and L bands). In the assembly in which the dispersion-compensating optical fiber DSF2 of the second embodiment and the dispersion-shifted optical fiber NZDSF were connected to each other, the average chromatic dispersion on the whole had a deviation of 0.2 ps/nm/km or less in a wavelength band of 1535 nm to 1560 nm (C band). Further, in the assembly in which the dispersion-compensating optical fiber DSF3 of the third embodiment and the dispersion-shifted optical fiber NZDSF were connected to each other, the average chromatic dispersion on the whole had a deviation of 0.2 ps/nm/km or less in a wavelength band of 1535 nm to 1560 nm (C band). As a consequence, they are capable of optical transmission over a distance of 400 km at a bit rate of 40 Gb/s.

Figure 8:
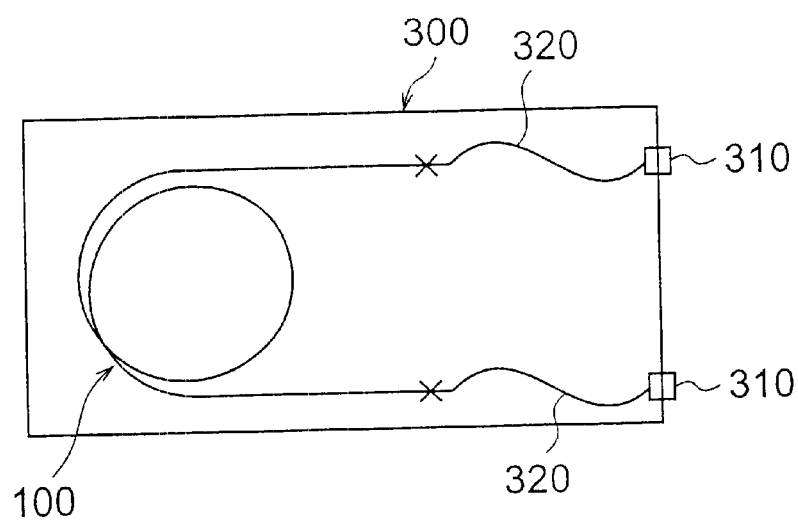
FIG. 8 is a view showing a schematic structure of the dispersion-compensating module according to the present invention.

FIG. 8 is a view showing a schematic structure of a dispersion-compensating module including the dispersion-compensating optical fiber according to the present invention. The dispersion-compensating optical fiber 100 (corresponding to the dispersion-compensating optical fiber 32) is accommodated in the case 300 with input- and output-connectors 310. Two ends of the fiber 100 are respectively fusion-spliced to pigtail fibers 320 to reduce connection loss. When the dispersion-compensating optical fiber DCF1 of the first embodiment having a length of 10.3 km was wound at a bending diameter of 140 mm so as to form a dispersion-compensating module, the dispersion-compensating amount at the wavelength of 1550 nm was −640 ps/nm, and the total loss was 4.1 dB (at the wavelength of 1550 nm). When the dispersion-compensating optical fiber DCF2 of the second embodiment having a length of 8.0 km was wound at a bending diameter of 140 mm so as to form a dispersion-compensating module, the dispersion-compensating amount at the wavelength of 1550 nm was −640 ps/nm, and the total loss was 4.4 dB (at the wavelength of 1550 nm). Further, when the dispersion-compensating optical fiber DCF3 of the third embodiment having a length of 7.5 km was wound at a bending diameter of 140 mm so as to form a dispersion-compensating module, the dispersion-compensating amount at the wavelength of 1550 nm was −640 ps/nm, and the total loss was 4.1 dB (at the wavelength of 1550 nm).

Also, when the dispersion-compensating optical fiber DCF1 of the first embodiment was wound at a bending diameter of 140 mm so as to form a dispersion-compensating module, while the dispersion-compensating amount at the wavelength of 1550 nm was −320 ps/nm, the total loss was 2.3 db (at the wavelength of 1550 nm). When the dispersion-compensating optical fiber DCF2 of the second embodiment was wound at a bending diameter of 140 mm so as to form a dispersion-compensating module, while the dispersion-compensating amount at a wavelength of 1550 nm was −320 ps/nm, the total loss was 2.5 dB (at the wavelength of 1550 nm). Further, when the dispersion-compensating optical fiber DCF3 of the third embodiment was wound at a bending diameter of 140 mm so as to form a dispersion-compensating module, while the dispersion-compensating amount at a wavelength of 1550 nm was −320 ps/nm, the total loss was 2.7 dB (at the wavelength of 1550 nm).

Thus, each of the dispersion-compensating optical fibers DCF1 to DCF3 can compensate for the chromatic dispersion and dispersion slope of the dispersion-shifted optical fiber NZDSF by a short length with a low loss in a wide wavelength band including the wavelength of 1550 nm.

Fourth Embodiment

In the dispersion-compensating optical fiber DCF4 according to the fourth embodiment, with respect to the third cladding 123, the relative refractive index difference $\Delta n_1$ of the core region 110 was 1.6%, the relative refractive index difference $\Delta n_2$ of the first cladding 121 was −0.50%, the relative refractive index difference $\Delta n_3$ of the second cladding 122 was 0.24%, the ratio (2a/2c) of the respective outside diameters of the core region 110 and second cladding 122 was 0.23, and the ratio (2b/2c) of the respective outside diameters of the first cladding 121 and second cladding 122 was 0.55. When the outside diameter 2c of the second cladding 122 was 19.2 μm, at the wavelength of 1550 nm, the dispersion-compensating optical fiber DCF4 of the fourth embodiment exhibited a chromatic dispersion $D_{DCF}$ of −85.1 ps/nm/km, a dispersion slope $S_{DCF}$ of −0.83 ps/nm²/km, an effective area of 18.1 μm², a bending loss of 0.9 dB/m at a bending diameter of 20 mm, a transmission loss of 0.38 dB/km. Also, its cutoff wavelength was 1638 nm, and the ratio ($S_{DCF}/D_{DCF}$) at the wavelength of 1550 nm was 0.0098/nm.

Figure 9:
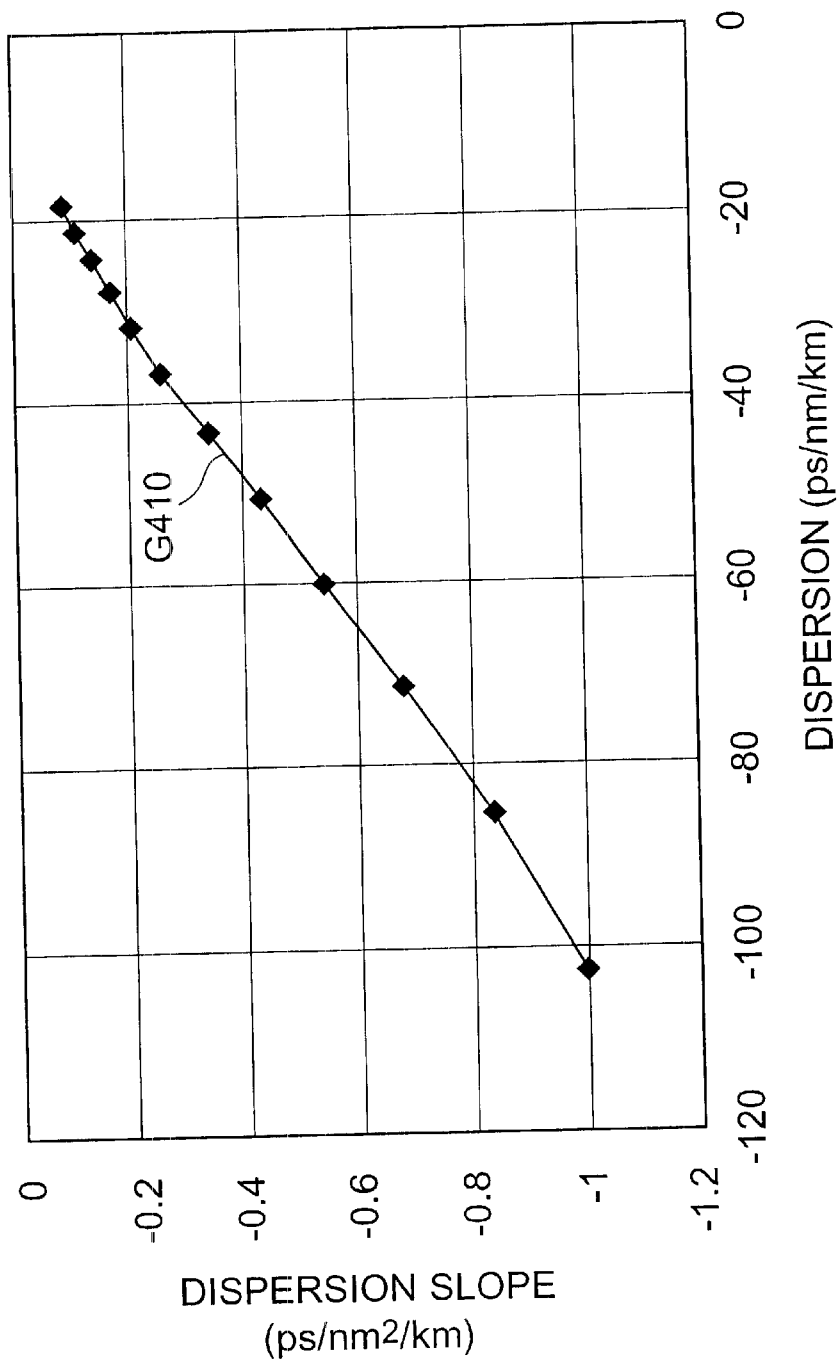
FIG. 9 is a graph showing the relationship between chromatic dispersion and dispersion slope of the dispersion-compensating optical fiber according to the fourth embodiment at the wavelength of 1550 nm.

FIG. 9 is a graph showing a relationship between chromatic dispersion and dispersion slope in the dispersion-compensating optical fiber of the fourth embodiment at the wavelength of 1550 nm. In FIG. 9, G410 indicates a curve for the fourth embodiment. Shown here is the relationship between chromatic dispersion $D_{DCF}$ and dispersion slope $S_{DCF}$ in the dispersion-compensating optical fiber of this embodiment when the outside diameter 2c of the second cladding 122 is changed. As can be seen from the graph of FIG. 9, the change in the ratio ($S_{DCF}/D_{DCF}$) of dispersion slope $S_{DCF}$ to the chromatic dispersion $D_{DCF}$ is kept to be 10% or less in the dispersion-compensating optical fibers DCF4 if the chromatic dispersion $D_{DCF}$ is approximately within the range of −102 ps/nm/km to −71 ps/nm/km even when the outside diameter 2c of the second cladding 122 changes by 2%. In the dispersion-compensating optical fiber DCF4 of the fourth embodiment, the ratio ($S_{DCF}/D_{DCF}$) changes by 5.8% or less when the outside diameter 2c of the second cladding 122 changes by 2%. If the change in ratio ($S_{DCF}/D_{DCF}$) is 10% or less when the outside diameter 2c of the second cladding 122 changes by 2% as such, then a dispersion-compensating optical fiber having a desirable chromatic dispersion characteristic can easily be made.

Figure 10:
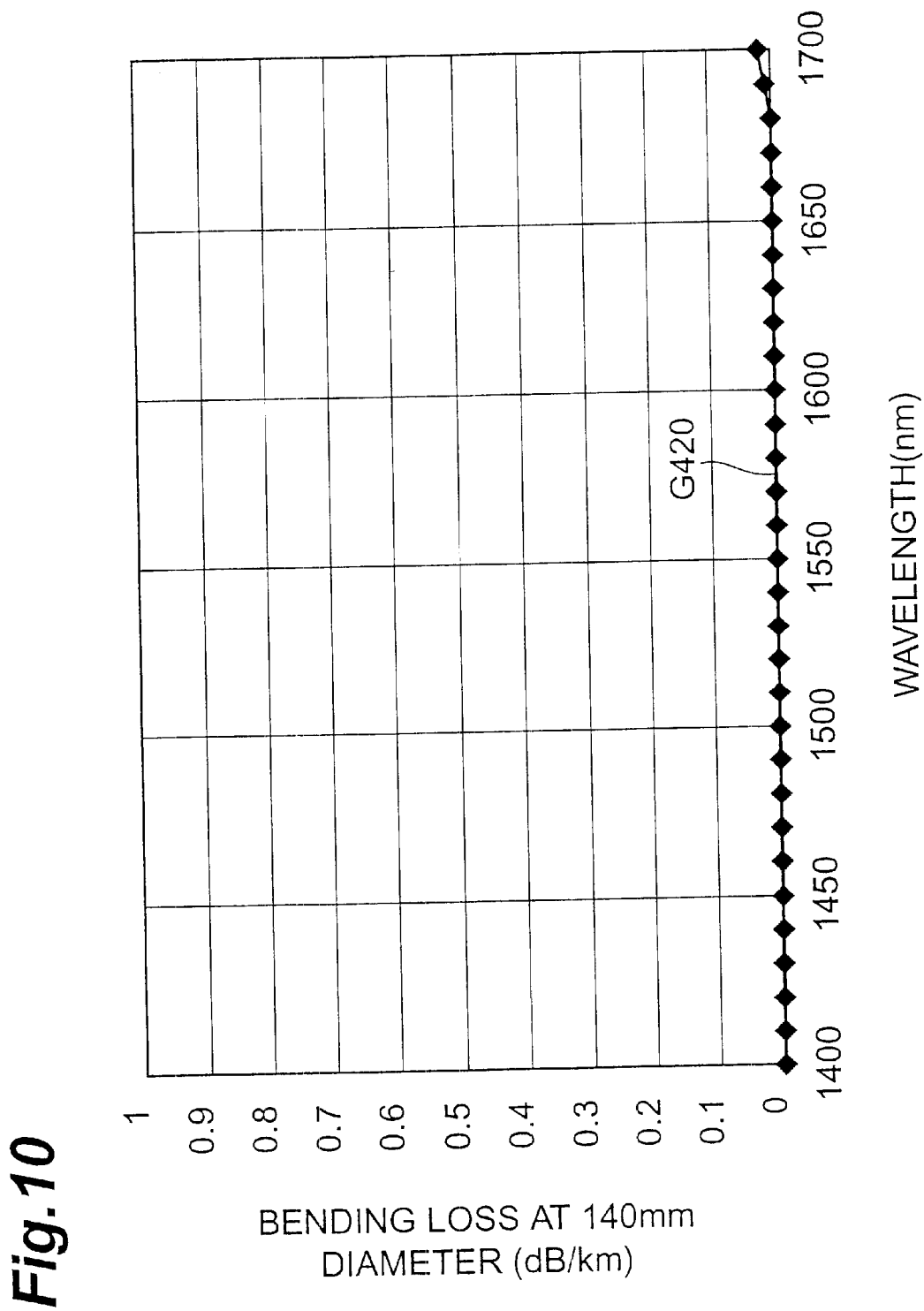
FIG. 10 is a graph showing the wavelength dependence of bending loss at a bending diameter of 140 mm of the dispersion-compensating optical fiber according to the fourth embodiment.

FIG. 10 is a graph showing the wavelength dependence of bending loss in the dispersion-compensating optical fiber of the fourth embodiment at a bending diameter of 140 mm. In FIG. 5, G420 indicates a curve for the fourth embodiment. The outside diameter 2c of the second cladding 122 in the dispersion-compensating optical fiber DCF4 of the fourth embodiment was 17.2 μm. As can be seen from the graph of FIG. 10, the dispersion-compensating optical fibers DCF4 has a low bending loss in the range where wavelength is 1610 nm or shorter.

Therefore, the dispersion-compensating optical fibers DCF4 is not only suitably employable as the dispersion-compensating optical fiber 32 constituting a part of the optical transmission line 30 in the optical transmission system 1 shown in FIG. 1, but also is suitably employable as the dispersion-compensating optical fiber 32 forming a dispersion-compensating module in the optical transmission system 2 shown in FIG. 2, thereby being able to compensate for chromatic dispersion not only in the C band but also in the L band with a low loss.

Figure 11:
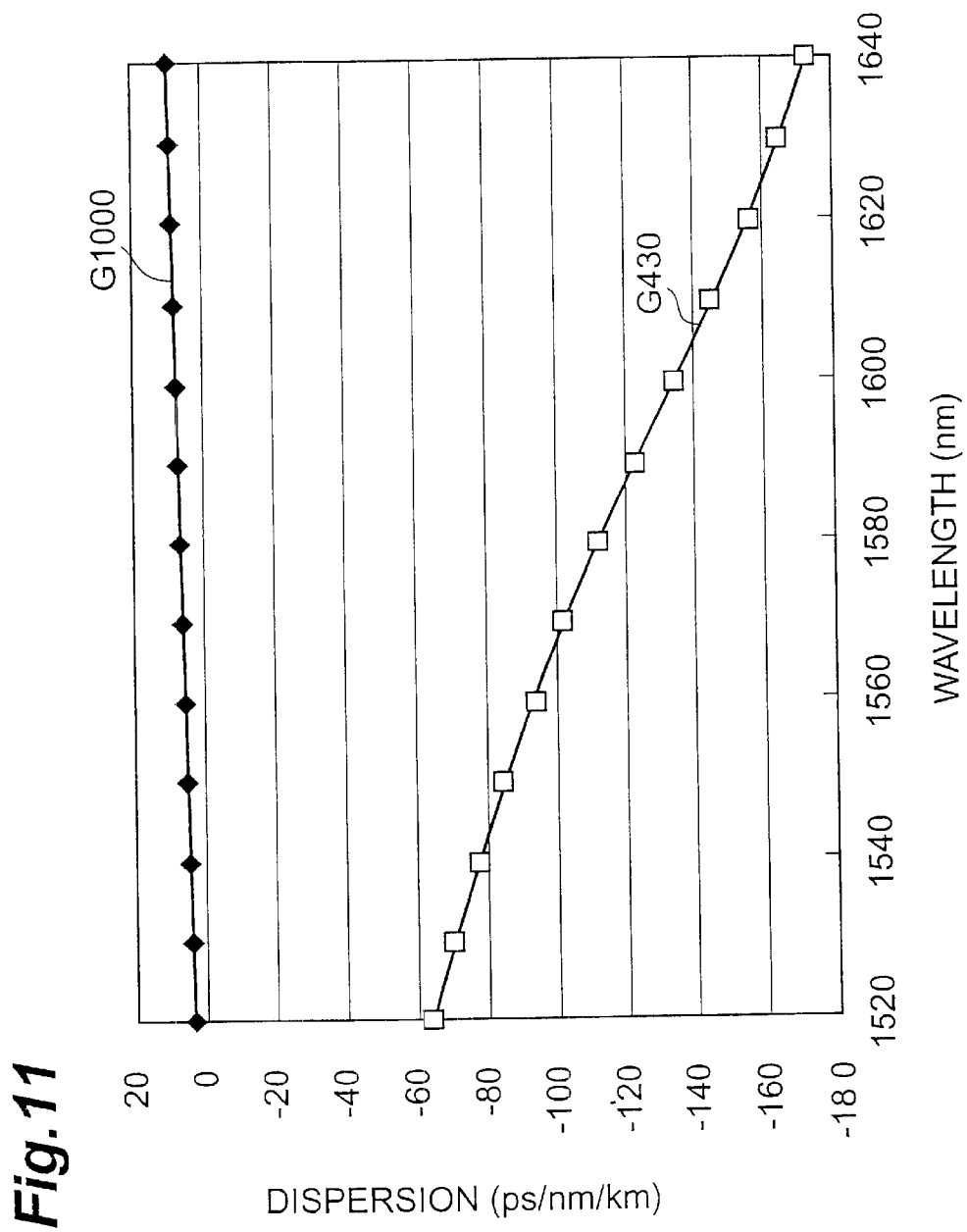
FIG. 11 is a graph showing the wavelength dependence of chromatic dispersion of the dispersion-compensating optical fiber according to the fourth embodiment.

FIG. 11 is a graph showing the wavelength dependence of chromatic dispersion in the dispersion-compensating optical fiber of the fourth embodiment. In FIG. 11, G430 indicates a curve for the fourth embodiment, and G1000 indicates a curve for a non-zero dispersion-shifted optical fiber NZDSF disclosed in the above-mentioned document 1, having a dispersion of 4 ps/nm/km or less and a dispersion slope of 0.046 ps/nm²/km or less. Here, the outside diameter 2c of the second cladding 122 in the dispersion-compensating optical fiber DCF4 of the fourth embodiment was 19.2 μm, too.

Figure 12:
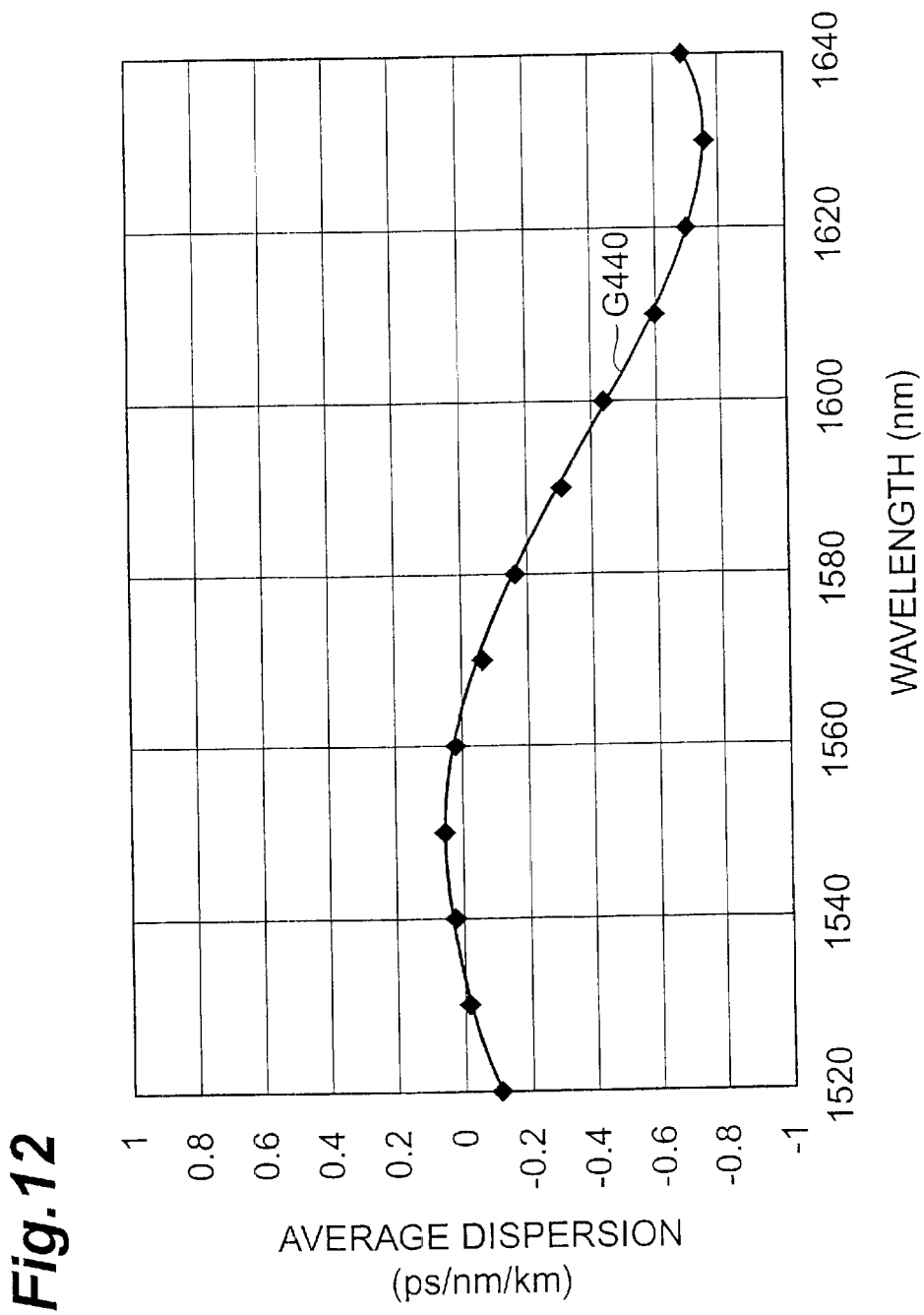
FIG. 12 is a graph showing the wavelength dependence of average chromatic dispersion on the whole of each assembly in which the dispersion-compensating optical fiber according to the fourth embodiment and a dispersion-shifted optical fiber are fusion-spliced to each other.

FIG. 12 is a graph showing the wavelength dependence of the average chromatic dispersion on the whole, in the assembly made by the dispersion-compensating optical fiber of the fourth embodiment and the dispersion-shifted optical fiber connected to each other. In FIG. 12, G440 indicates a curve for the assembly in which the dispersion-compensating optical fiber DCF4 of the fourth embodiment and the dispersion-shifted optical fiber NZDSF of FIG. 11 were connected to each other. For compensating for the chromatic dispersion at the wavelength of 1550 nm of the dispersion-shifted optical fiber NZDSF having the chromatic dispersion characteristic shown in FIG. 11 and a length of 80 km, a length of 10.3 km was necessary for the dispersion-compensating optical fiber DCF1 of the first embodiment, a length of 4.4 km was necessary for the dispersion-compensating optical fiber DCF4 of the fourth embodiment.

In the assembly in which the dispersion-compensating optical fiber DSF4 of the fourth embodiment and the dispersion-shifted optical fiber NZDSF were connected to each other, the total average chromatic dispersion had a deviation of 0.2 ps/nm/km or less in a wavelength band of 1535 nm to 1600 nm (C and L bands). As a consequence, they are capable of optical transmission over a repeater distance of 400 km at a bit rate of 40 Gb/s.

When the dispersion-compensating optical fiber DCF4 of the fourth embodiment having a length of 4.4 km was wound at a bending diameter of 140 mm so as to form a dispersion-compensating module, the dispersion-compensating amount at the wavelength of 1550 nm was −640 ps/nm, and the total loss was 3.9 dB (at the wavelength of 1550 nm). Also, when the dispersion-compensating optical fiber DCF4 of the fourth embodiment was wound at a bending diameter of 140 mm so as to form a dispersion-compensating module, while the dispersion-compensating amount at the wavelength of 1550 nm was −320 ps/nm, the total loss was 2.5 dB (at the wavelength of 1550 nm).

Thus, the dispersion-compensating optical fibers DCF4 can compensate for the chromatic dispersion and dispersion slope of the dispersion-shifted optical fiber NZDSF by a short length with a low loss in a wide wavelength band including the wavelength of 1550 nm.

Fifth Embodiment

In the dispersion-compensating optical fiber DCP5 according to the fifth embodiment, with respect to the third cladding 123, the relative refractive index difference $\Delta n_1$ of the core region 110 was 2.1%, the relative refractive index difference $\Delta n_2$ of the first cladding 121 was −0.50%, the relative refractive index difference $\Delta n_3$ of the second cladding 122 was 0.20%, the ratio ($2a/2c$) of the respective outside diameters of the core region 110 and second cladding 122 was 0.18, and the ratio ($2b/2c$) of the respective outside diameters of the first cladding 121 and second cladding 122 was 0.49. When the outside diameter $2c$ of the second cladding 122 was 19.4 µm, at the wavelength of 1550 nm, the dispersion-compensating optical fiber DCF5 of the fifth embodiment exhibited a chromatic dispersion $D_{DCF}$ of −160.7 ps/nm/km, a dispersion slope $S_{DCF}$ of −1.63 ps/nm$^2$/km, an effective area of 15.7 µm$^2$, a bending loss of 1.8 dB/m at a bending diameter of 20 mm, a transmission loss of 0.49 dB/km. Also, its cutoff wavelength was 1566 nm, and the ratio ($S_{DCF}/D_{DCF}$) at the wavelength of 1550 nm was 0.0101/nm.

Sixth Embodiment

In the dispersion-compensating optical fiber DCF6 according to the sixth embodiment, with respect to the third cladding 123, the relative refractive index difference $\Delta n_1$ of the core region 110 was 2.4%, the relative refractive index difference $\Delta n_2$ of the first cladding 121 was −0.50%, the relative refractive index difference $\Delta n_3$ of the second cladding 122 was 0.40%, the ratio ($2a/2c$) of the respective outside diameters of the core region 110 and second cladding 122 was 0.20, and the ratio ($2b/2c$) of the respective outside diameters of the first cladding 121 and second cladding 122 was 0.65. When the outside diameter $2c$ of the second cladding 122 was 16.0 µm, at the wavelength of 1550 nm, the dispersion-compensating optical fiber DCF6 of the sixth embodiment exhibited a chromatic dispersion $D_{DCF}$ of −181.6 ps/nm/km, a dispersion slope $S_{DCF}$ of −1.87 ps/nm$^2$/km, an effective area of 13.8 µm$^2$, a bending loss of 0.5 dB/m at a bending diameter of 20 mm, a transmission loss of 0.61 dB/km. Also, its cutoff wavelength was 1660 nm, and the ratio ($S_{DCF}/D_{DCF}$) at the wavelength of 1550 nm was 0.0103/nm.

Seventh Embodiment

In the dispersion-compensating optical fiber DCF7 according to the seventh embodiment, with respect to the third cladding 123, the relative refractive index difference $\Delta n_1$ of the core region 110 was 2.7%, the relative refractive index difference $\Delta n_2$ of the first cladding 121 was −0.50%, the relative refractive index difference $\Delta n_3$ of the second cladding 122 was 0.40%, the ratio ($2a/2c$) of the respective outside diameters of the core region 110 and second cladding 122 was 0.19, and the ratio ($2b/2c$) of the respective outside diameters of the first cladding 121 and second cladding 122 was 0.67. When the outside diameter $2c$ of the second cladding 122 was 15.2 µm, at the wavelength of 1550 nm, the dispersion-compensating optical fiber DCF7 of the seventh embodiment exhibited a chromatic dispersion $D_{DCF}$ of −215.8 ps/nm/km, a dispersion slope. $S_{DCF}$ of −2.12 ps/nm$^2$/km, an effective area of 13.1 m$^2$, a bending loss of 1.3 db/m at a bending diameter of 20 mm, a transmission loss of 0.75 dB/km. Also, its cutoff wavelength was 1514 nm, and the ratio ($S_{DCF}/D_{DCF}$) at the wavelength of 1550 nm was 0.0097/nm.

Figure 13:
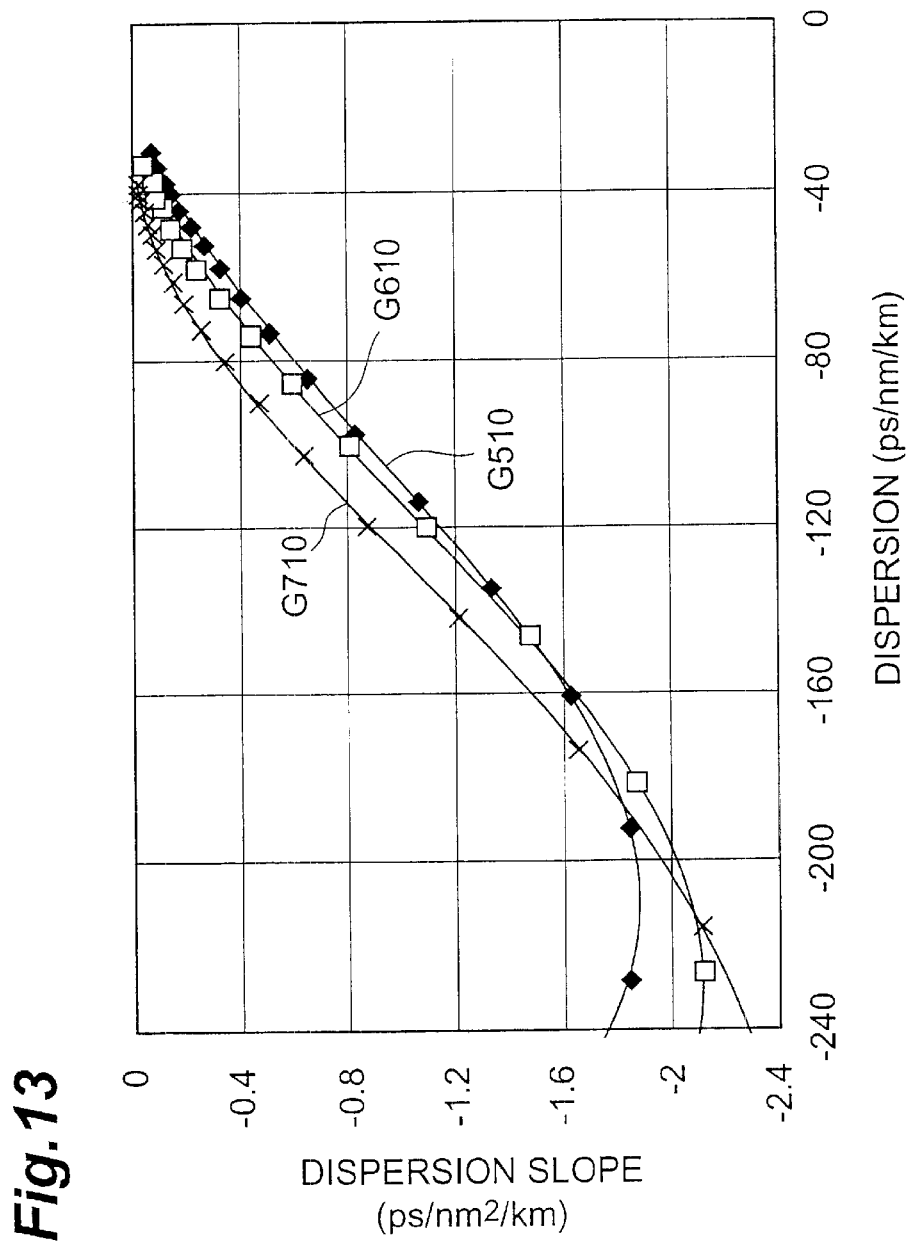
FIG. 13 is a graph showing the relationship between chromatic dispersion and dispersion slope of the dispersion-compensating optical fibers according to the fifth to seventh embodiments at the wavelength of 1550 nm.

FIG. 13 is a graph showing a relationship between chromatic dispersion and dispersion slope in each dispersion-compensating optical fiber of the fifth to seventh embodiments at the wavelength of 1550 nm. In FIG. 13, G510 indicates a curve for the fifth embodiment, G610 indicates a curve for the sixth embodiment, and G710 indicates a curve for the seventh embodiment. Shown here is the relationship between chromatic dispersion $D_{DCF}$ and dispersion slope $S_{DCF}$ in each dispersion-compensating optical fiber of these embodiments when the outside diameter $2c$ of the second cladding 122 is changed. As can be seen from the graph of FIG. 13, the change in the ratio ($S_{DCF}/D_{DCF}$) of dispersion slope $S_{DCF}$ to the chromatic dispersion $D_{DCF}$ is small in each of the dispersion-compensating optical fibers DCF5 to DCF7 if the chromatic dispersion $D_{DCF}$ is approximately within the range of −200 ps/nm/km to −120 ps/nm/km even when the outside diameter $2c$ of the second cladding 122 changes by 2%. In the dispersion-compensating optical fiber DCF5 of the fifth embodiment, the ratio ($S_{DCF}/D_{DCF}$) changes by 7.7% or less when the outside diameter $2c$ of the second cladding 122 changes by 2%, and further the range of the chromatic dispersion where the ratio ($S_{DCF}/D_{DCF}$) is kept to be 10% or less is −192 ps/nm/km to −135 ps/nm/km. In the dispersion-compensating optical fiber DCF6 of the sixth embodiment, the ratio ($S_{DCF}/D_{DCF}$) changes by 4.6% or less when the outside diameter $2c$ of the second cladding 122 changes by 2%, and further the range of the chromatic dispersion where the ratio ($S_{DCF}/D_{DCF}$) is kept to be 10% or less is −226 ps/nm/km to −146 ps/nm/km. In the dispersion-compensating optical fiber DCF7 of the seventh embodiment, the ratio ($S_{DCF}/D_{DCF}$) changes by 4.9% or less when the outside diameter $2c$ of the second cladding 122 changes by 2%, and further the range of the chromatic dispersion where the ratio ($S_{DCF}/D_{DCF}$) is kept to be 10% or less is −173 ps/nm/km to −269 ps/nm/km. If the change in ratio ($S_{DCF}/D_{DCF}$) is 10% or less when the outside diameter $2c$ of the second cladding 122 changes by 2% as such, then a dispersion-compensating optical fiber having a desirable chromatic dispersion characteristic can easily be made.

Figure 14:
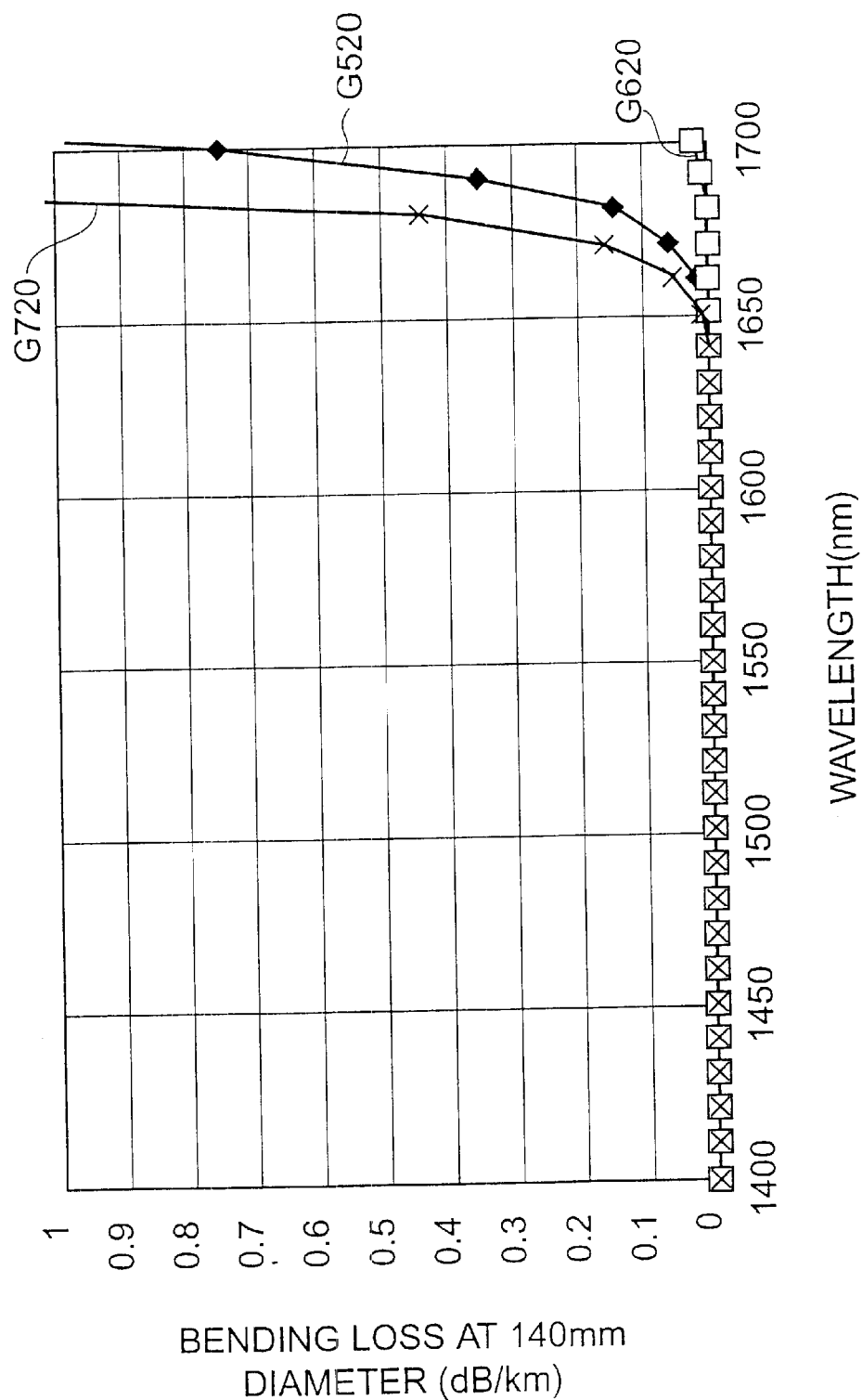
FIG. 14 is a graph showing the wavelength dependence of bending loss at a bending diameter of 140 mm of the dispersion-compensating optical fibers according to the fifth to seventh embodiments.

FIG. 14 is a graph showing the wavelength dependence of bending loss in each dispersion-compensating optical fiber of the fifth to seventh embodiments at a bending diameter of 140 mm. In FIG. 14, G520 indicates a curve for the fifth embodiment, G620 indicates a curve for the sixth embodiment, and G720 indicates a curve for the seventh embodiment. The outside diameter $2c$ of the second cladding 122 in the dispersion-compensating optical fiber DCF5 of the fifth embodiment was 19.4 µm, the outside diameter $2c$ of the second cladding 122 in the dispersion-compensating optical fiber DCF6 of the sixth embodiment was 16.0 µm, and the outside diameter $2c$ of the second cladding 122 in the dispersion-compensating optical fiber DCF7 of the seventh embodiment was 15.2 µm. As can be seen from the graph of FIG. 14, each of the dispersion-compensating optical fibers DCF5 to DCF7 has a low bending loss in the range where wavelength is 1610 nm or shorter.

Therefore, each of the dispersion-compensating optical fibers DCF5 to DCF7 is not only suitably employable as the dispersion-compensating optical fiber 32 constituting a part of the optical transmission line 30 in the optical transmission system 1 shown in FIG. 1, but also is suitably employable as the dispersion-compensating optical fiber 32 forming a dispersion-compensating module in the optical transmission system 2 shown in FIG. 2, thereby being able to compensate for chromatic dispersion not only in the C band but also in the L band with a low loss.

Figure 15:
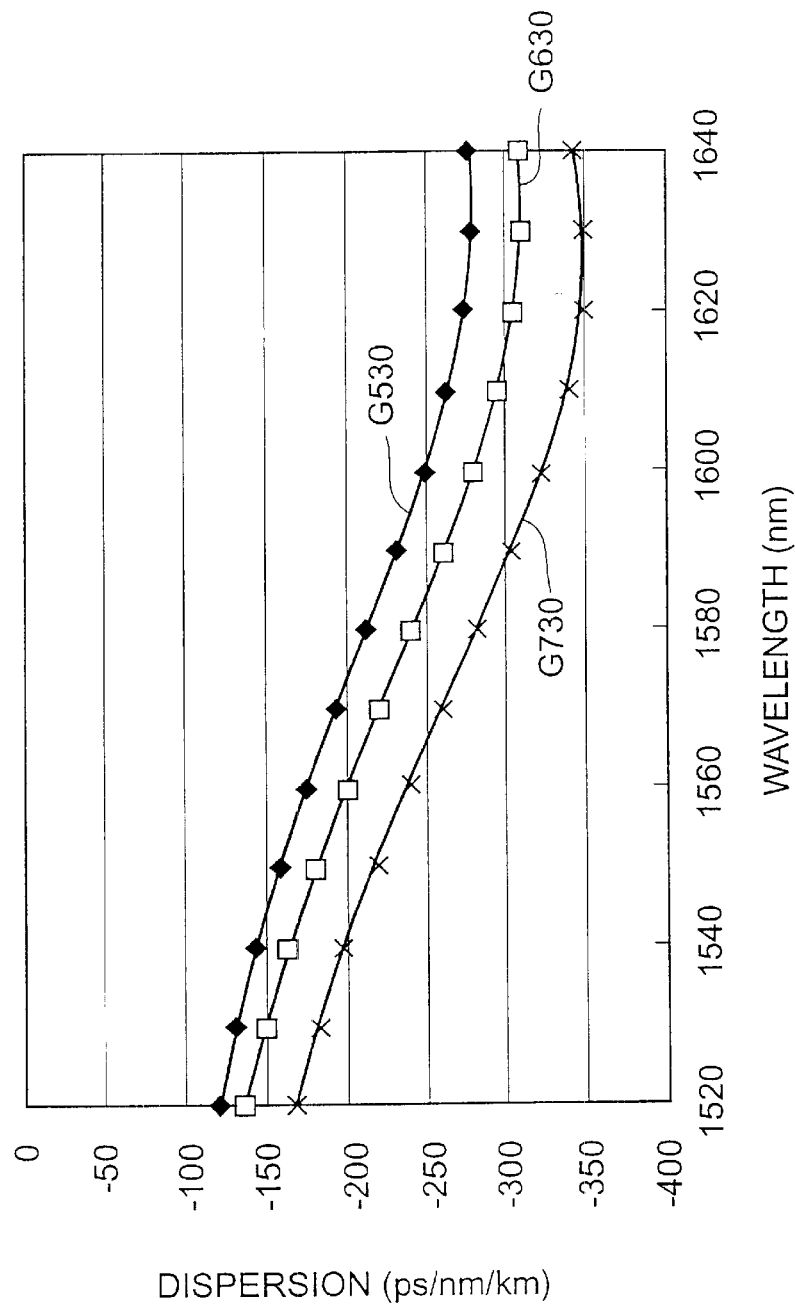
FIG. 15 is a graph showing the wavelength dependence of chromatic dispersion of the dispersion-compensating optical fibers according to the fifth to seventh embodiments.

FIG. 15 is a graph showing the wavelength dependence of chromatic dispersion in each dispersion-compensating optical fiber of the fifth to seventh embodiments. In FIG. 15, G530 indicates a curve for the fifth embodiment, G630 indicates a curve for the sixth embodiment, and G730 indicates a curve for the seventh embodiment. Here, the outside diameter 2c of the second cladding 122 in the dispersion-compensating optical fiber DCF5 of the fifth embodiment was 19.4 µm, the outside diameter 2c of the second cladding 122 in the dispersion-compensating optical fiber DCF6 of the sixth embodiment was 16.0 µm, and the outside diameter 2c of the second cladding 122 in the dispersion-compensating optical fiber DCF7 of the seventh embodiment was 15.2 µm, too.

Figure 16:
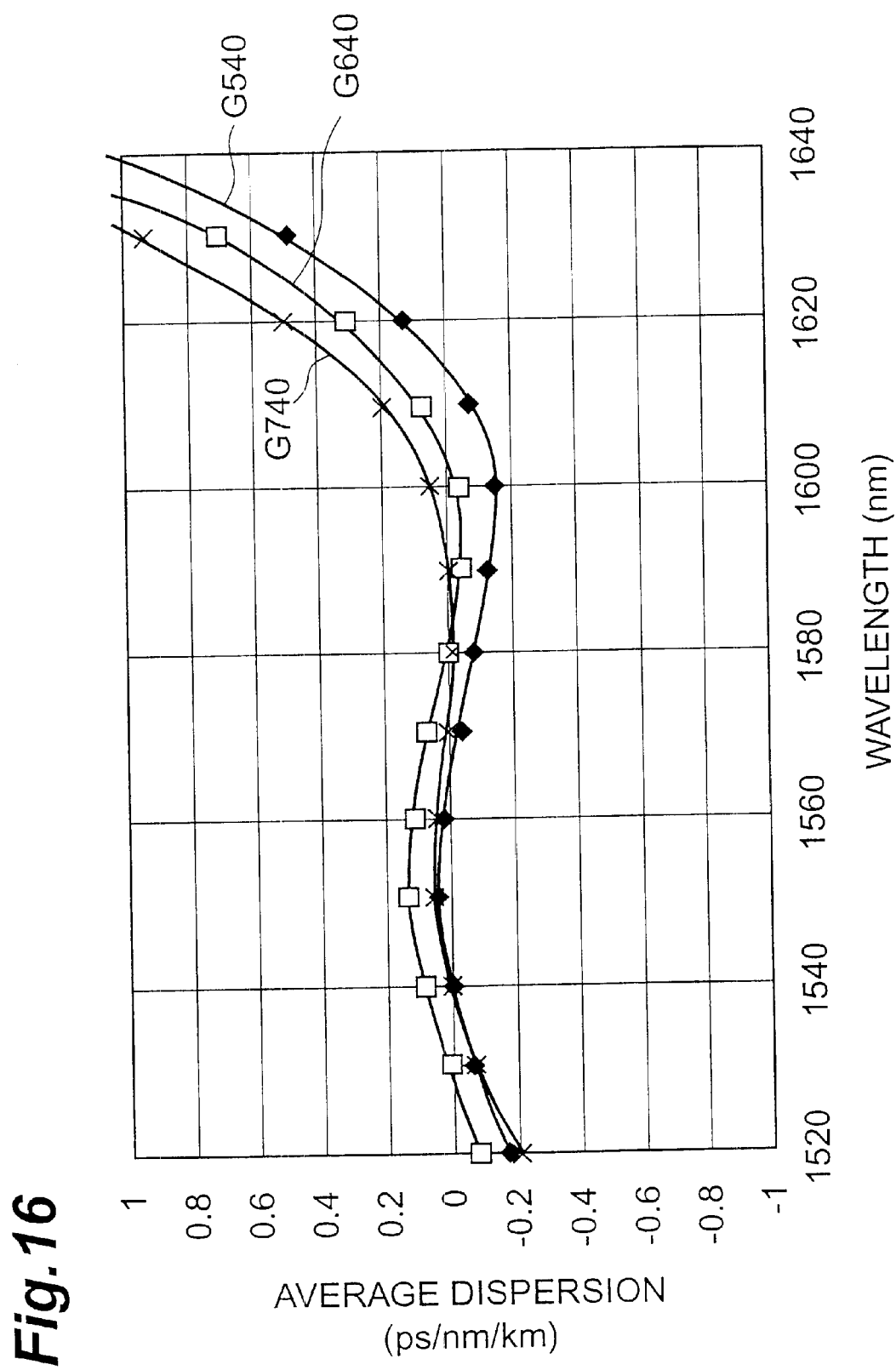
FIG. 16 is a graph showing the wavelength dependence of average chromatic dispersion on the whole of each assembly in which the dispersion-compensating optical fiber according to each of the fifth to seventh embodiments and a dispersion-shifted optical fiber are fusion-spliced to each other.

FIG. 16 is a graph showing the wavelength dependence of the average chromatic dispersion on the whole, in each assembly made by each dispersion-compensating optical fiber of the fifth to seventh embodiments and a non-dispersion-shifted optical fiber, which is disclosed in the above-mentioned document 2 and has a dispersion of 4 ps/nm/km or less and a dispersion slope of 0.046 ps/nm$^2$/km or less, connected to each other. In FIG. 16, G540 indicates a curve for the assembly in which the dispersion-compensating optical fiber DCF5 of the fifth embodiment and the dispersion-shifted optical fiber NZDSF of the document 2 were connected to each other, G640 indicates a curve for the assembly in which the dispersion-compensating optical fiber DCF6 of the sixth embodiment and the dispersion-shifted optical fiber NZDSF of the document 2 were connected to each other, and G740 indicates a curve for the assembly in which the dispersion-compensating optical fiber DCF7 of the seventh embodiment and the dispersion-shifted optical fiber NZDSF of the document 2 were connected to each other. For compensating for the chromatic dispersion at the wavelength of 1550 nm of the dispersion-shifted optical fiber NZDSF having a length of 80 km, a length of 2.2 km was necessary for the dispersion-compensating optical fiber DCF5 of the fifth embodiment, a length of 1.9 km was necessary for the dispersion-compensating optical fiber DCF6 of the sixth embodiment, and a length of 1.7 km was necessary for the dispersion-compensating optical fiber DCF7 of the seventh embodiment.

In the assembly in which the dispersion-compensating optical fiber DSF5 of the fifth embodiment and the dispersion-shifted optical fiber NZDSF were connected to each other, the total average chromatic dispersion had a deviation of 0.2 ps/nm/km or less in a wavelength band of 1535 nm to 1560 nm (C band). In the assembly in which the dispersion-compensating optical fiber DSF6 of the sixth embodiment and the dispersion-shifted optical fiber NZDSF were connected to each other, the average chromatic dispersion on the whole had a deviation of 0.2 ps/nm/km or less in a wavelength band of 1535 nm to 1600 nm (C and L bands). Further, in the assembly in which the dispersion-compensating optical fiber DSF7 of the seventh embodiment and the dispersion-shifted optical fiber NZDSF were connected to each other, the average chromatic dispersion on the whole had a deviation of 0.2 ps/nm/km or less in a wavelength band of 1535 nm to 1600 nm (C and L bands). As a consequence, they are capable of optical transmission over a repeater distance of 400 km at a bit rate of 40 Gb/s.

As shown in FIG. 8, when the dispersion-compensating optical fiber DCF5 of the fifth embodiment having a length of 2.2 km was wound at a bending diameter of 140 mm so as to form a dispersion-compensating module, the dispersion-compensating amount at the wavelength of 1550 nm was −640 ps/nm, and the total loss was 3.0 dB (at the wavelength of 1550 nm). When the dispersion-compensating optical fiber DCF6 of the sixth embodiment having a length of 1.9 km was wound at a bending diameter of 140 mm so as to form a dispersion-compensating module, the dispersion-compensating amount at the wavelength of 1550 nm was −640 ps/nm, and the total loss was 2.7 dB (at the wavelength of 1550 nm). Further, when the dispersion-compensating optical fiber DCF7 of the seventh embodiment having a length of 1.7 km was wound at a bending diameter of 140 mm so as to form a dispersion-compensating module, the dispersion-compensating amount at the wavelength of 1550 nm was −640 ps/nm, and the total loss was 2.5 dB (at the wavelength of 1550 nm).

Also, when the dispersion-compensating optical fiber DCF5 of the fifth embodiment was wound at a bending diameter of 140 mm so as to form a dispersion-compensating module, while the dispersion-compensating amount at the wavelength of 1550 nm was −320 ps/nm, the total loss was 2.0 dB (at the wavelength of 1550 nm). When the dispersion-compensating optical fiber DCF6 of the sixth embodiment was wound at a bending diameter of 140 mm so as to form a dispersion-compensating module, while the dispersion-compensating amount at a wavelength of 1550 nm was −320 ps/nm, the total loss was 1.9 dB (at the wavelength of 1550 nm). Further, when the dispersion-compensating optical fiber DCF7 of the seventh embodiment was wound at a bending diameter of 140 mm so as to form a dispersion-compensating module, while the dispersion-compensating amount at a wavelength of 1550 nm was −320 ps/nm, the total loss was 1.7 dB (at the wavelength of 1550 nm).

Thus, each of the dispersion-compensating optical fibers DCF5 to DCF7 can compensate for the chromatic dispersion and dispersion slope of the dispersion-shifted optical fiber NZDSF by a short length with a low loss in a wide wavelength band including the wavelength of 1550 nm.

COMPARATIVE EXAMPLE

Figure 17A:
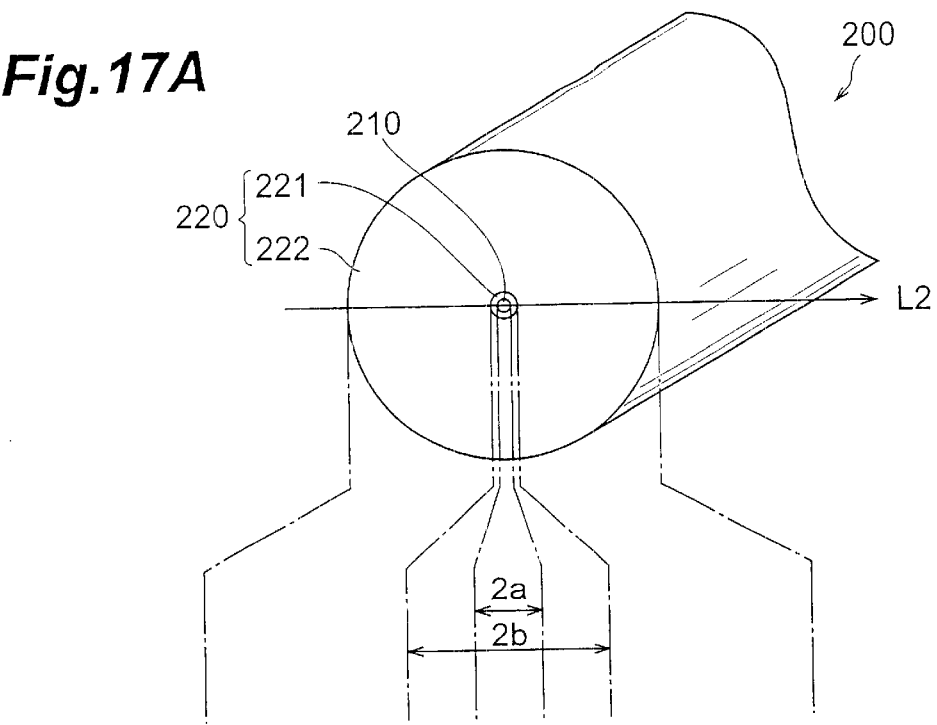
FIGS. 17A and 17B are views showing a cross-sectional structure of the dispersion-compensating optical fiber according to the comparative example and its refractive index profile, respectively.
Figure 17B:
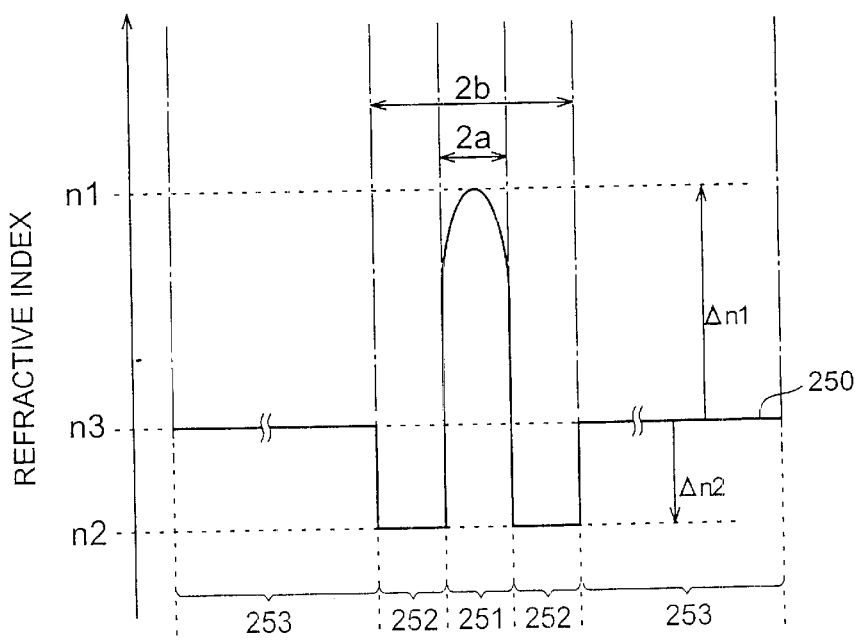

For comparison with the dispersion-compensating optical fiber of each of the above-mentioned first to seventh embodiments, the dispersion-compensating optical fiber of a comparative example will now be explained. FIGS. 17A and 17B are views showing a cross-sectional structure of the dispersion-compensating optical fiber according to the comparative example and its refractive index profile, respectively. This comparative example 200 comprises a core region 210 extending along a predetermined axis and a cladding region 220 provided so as to surround the outer periphery of the core region 210. The core region 210 has a refractive index $n_1$ and an outer diameter of 2a. Further, the cladding region 220 comprises a first cladding 221 having a second refractive index $n_2$ ($<n_1$) and an outside diameter 2b, and a second cladding 222 provided so as to surround the outer periphery of the first cladding 221, having a third refractive index $n_3$ ($>n_2$, $<n_1$).

The refractive index profile 250 shown in FIG. 17B indicates respective refractive indices at individual parts on the line L2 in FIG. 17A, such that areas 251, 252, and 253 in the refractive index profile 150 represent refractive indices of individual parts on the line L2 in the core region 210, first cladding 221, and second cladding 222, respectively.

In the comparative example 200 of FIGS. 17A and 17B, with respect to the second cladding 222 acting as a reference region, the relative refractive index difference $\Delta n_1$ of the core region 210, and the relative refractive index difference $\Delta n_2$ of first cladding 221 are given by the following respective expressions:

$$\Delta n_1 = (n_1 - n_3)/n_3$$

$$\Delta n_2 = (n_2 - n_3)/n_3$$

where $n_1$ is the refractive index of the core region 210, $n_2$ is the refractive index of the first cladding 221, and $n_3$ is the refractive index of the second cladding 222 acting as the reference region. In this specification, the relative refractive index difference of each part is expressed in terms of percentage, and individual parameters in the above-mentioned expressions may be placed in the fixed order. Therefore, the relative refractive index difference of a glass region having a refractive index lower than that of the second cladding 222 (reference region) is expressed by a negative value.

Here, in the comparative example 200, with reference to the refractive index $n_3$ of the second cladding 222, the core region 210 has a relative refractive index difference $\Delta n_1$ of 1.2%, the first cladding 221 has a relative refractive index difference $\Delta n_2$ of −0.36%. Also, the ratio Ra (=2a/2b) of the outside diameter 2a of the core region 210 to the outside diameter 2b of the first cladding 221 is 0.50.

Figure 18:
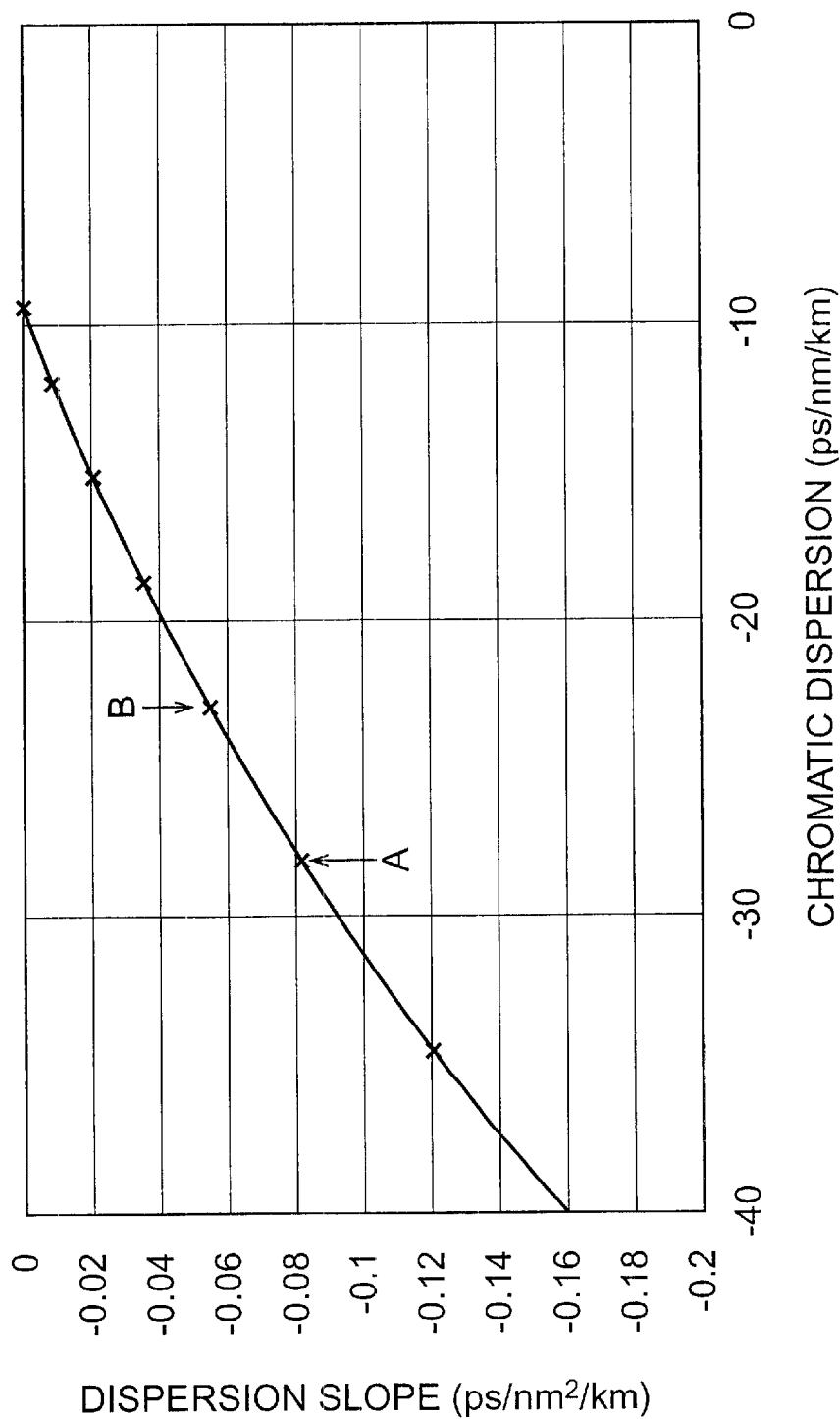
FIG. 18 is a graph showing the relationship between chromatic dispersion and dispersion slope of the dispersion-compensating optical fiber according to the comparative example at the wavelength of 1550 nm.

FIG. 18 is a graph showing the relationship between chromatic dispersion and dispersion slope of the dispersion-compensating optical fiber of the comparative example at the wavelength of 1550 nm. Shown here is the relationship between chromatic dispersion $D_{DCF}$ and dispersion slope $S_{DCF}$ in the comparative example when the outside diameter 2b of the first cladding 221 is changed. In the range where chromatic dispersion is −40 ps/nm/km or less, the comparative example has such an unfavorable bending characteristic that it cannot be used. If the outside diameter 2c of the second cladding 222 changes greatly, then the ratio ($S_{DCF}/D_{DCF}$) of dispersion slope $S_{DCF}$ to the chromatic dispersion $D_{DCF}$ will change greatly. For example, when the outside diameter 2b of the first cladding 221 is 10.0 μm, then the chromatic dispersion $D_{DCF}$ is −28 ps/nm/km (a condition corresponding to the point A in FIG. 18), whereby the dispersion slope $S_{DCF}$ is −0.081 ps/nm$_2$/km. Also, when the outside diameter 2b of the first cladding 221 is 9.8 μm, then the chromatic dispersion $D_{DCF}$ is −22 ps/nm/km (a condition corresponding to the point B in FIG. 18), whereby the dispersion slope $S_{DCF}$ is −0.056 ps/nm$_2$/km. If the outside diameter 2b changes from this value by 2%, then the ratio ($S_{DCF}/D_{DCF}$) will change by as much as 17%. As a consequence, a dispersion-compensating optical fiber having a desirable chromatic dispersion characteristic is hard to make.

As compared with the dispersion-compensating optical fiber of the comparative example, the dispersion-compensating optical fiber according to the embodiment (including the dispersion-compensating optical fibers of the first to seventh embodiments) has excellent bending characteristics and can also be used in the range where chromatic dispersion is −40 ps/nm/km or less as mentioned above. Also, even when the outside diameter 2c of the second cladding changes, the change in ratio ($S_{DCF}/D_{DCF}$) of dispersion slope $S_{DCF}$ to the chromatic dispersion $D_{DCF}$ is small in the dispersion-compensating optical fiber according to the present invention if the chromatic dispersion $D_{DCF}$ is within a predetermined range. Therefore, it is easy for the dispersion-compensating optical fiber according to the present invention to be made with desirable chromatic dispersion characteristics.

As explained in detail in the foregoing, the dispersion-compensating optical fiber according to the present invention has, at a wavelength of 1550 nm, a chromatic dispersion $D_{DCF}$ of −40 ps/nm/km or less (preferably −100 ps/nm/km to −40 ps/nm/km or −250 ps/nm/km to −120 ps/nm/km), a ratio ($S_{DCF}/D_{DCF}$) of dispersion slope $S_{DCF}$ to the chromatic dispersion $D_{DCF}$ of 0.005/nm or more (preferably 0.005/nm to 0.015/nm). Since the dispersion-compensating optical fiber according to the present invention has such characteristics it can compensate for the chromatic dispersion and dispersion slope of a dispersion-shifted optical fiber in a wide wavelength band including the wavelength of 1550 nm by a short length.

If the dispersion-compensating optical fiber according to the present invention has an effective area of 16 μm$^2$ or more, preferably 20 μm$^2$ or more at the wavelength of 1550 nm, then it can restrain four-wave mixing from occurring and suppress deterioration in the waveforms of signals propagating therethrough. Its cutoff wavelength is preferably 1.2 μm to 1.8 μm (more preferably 1.4 μm to 1.8 μm), and its transmission loss at a wavelength of 1550 nm is preferably 0.5 dB/km or less. In this case, bending loss can be restrained from increasing since the cutoff wavelength is longer than that conventionally obtained, and lower loss is attained even when the optical fiber is formed into a cable or module, since the transmission loss lies within the numerical range mentioned above as well.

Preferably, the dispersion-compensating optical fiber according to the present invention has a core region having a first refractive index, a first cladding surrounding around the outer periphery of the core region and having a second refractive index lower than the first refractive index, a second cladding surrounding around the outer periphery of the first cladding and having a third refractive index higher than the second refractive index, and a third cladding surrounding around the outer periphery of the second cladding and having a fourth refractive index lower than the third refractive index. The core region preferably has a relative refractive index difference of 0.8% to 2.0% (preferably 0.8% to 1.5%) with reference to the fourth refractive index of the third cladding, and the first cladding preferably has a relative refractive index difference of −0.4% or lower with reference to the fourth refractive index of the third cladding. In these cases, a dispersion-compensating optical fiber having the above-mentioned characteristics can be realized easily. Preferably, the ratio ($S_{DCF}/D_{DCF}$) changes by 10% or less when the outside diameter of the second cladding changes by 2%. In this case, a dispersion-compensating optical fiber having a desirable chromatic dispersion characteristic can be made easily.

The optical transmission line according to the present invention has a repeater section laid with a dispersion-shifted optical fiber having, at the wavelength of 1550 nm, a chromatic dispersion of +2 ps/nm/km to +10 ps/nm/km and a dispersion slope of +0.04 ps/nm$^2$/km to +0.12 ps/nm$^2$/km; and the above-mentioned dispersion-compensating optical fiber of the present invention connected to the dispersion-shifted optical fiber. When the dispersion-shifted optical fiber and the dispersion-compensating optical fiber are connected to each other with an appropriate length ratio, thus formed optical transmission line yields, on the whole, an average chromatic dispersion with a small absolute value and an average dispersion slope with a small absolute value at a wavelength of 1550 nm. As a consequence, this optical transmission line has, on the whole, an average chromatic dispersion with a small absolute value and a small average transmission loss in a wide wavelength band including the wavelength of 1550 nm.

The optical transmission line according to the present invention preferably has, on the whole, a deviation of an average chromatic dispersion of 0.2 ps/nm/km or less in a wavelength band of 1535 nm to 1560 nm (C band), more preferably a deviation of an average chromatic dispersion on the whole of 0.2 ps/nm/km or less in a wavelength band of 1535 nm to 1600 nm (C and L bands). In an optical transmission system which carries out optical communications by making signals propagating through such an optical transmission line in this case, the optical transmission line yields a low average transmission loss, the average chromatic dispersion has a small absolute value, and optical transmission with a high bit rate is possible in a wide wavelength band (including at least the C band and further the L band) including a wavelength of 1550 nm. Therefore, this optical transmission system can elongate the repeater section and achieve further higher speed and larger capacity in optical communications.

The dispersion-compensating module according to the present invention is characterized in that the above-mentioned dispersion-compensating optical fiber according to the present invention is wound like a coil so as to form the module. The dispersion-compensating module in which the dispersion-compensating optical fiber is formed into a module compensates for the chromatic dispersion and dispersion slope of a dispersion-shifted optical fiber laid in a repeater section, and yields, on the whole, an average chromatic dispersion with a small absolute value and an average dispersion slope with a small absolute value at a wavelength of 1550 nm when the dispersion-shifted optical fiber and dispersion-compensating optical fiber have an appropriate length ratio therebetween. As a consequence, the dispersion-shifted optical fiber and dispersion-compensating module in total have an average chromatic dispersion with a smaller absolute value and a small average transmission loss in a wide wavelength band including the wavelength of 1550 nm.

The dispersion-compensating module according to the present invention preferably has a total loss of 7 dB or less in a wavelength band of 1535 nm to 1565 nm, more preferably a total loss of 7 dB or less in a wavelength band of 1535 nm to 1610 nm, when yielding a dispersion-compensating amount of −640 ps/nm at a wavelength of 1550 nm. In the dispersion-compensating module according to the present invention, the total loss is preferably 3 db or less in a wavelength band of 1535 nm to 1565 nm, more preferably 3 db or less in a wavelength band of 1535 nm to 1610 nm, when the dispersion-compensating amount is −320 ps/nm at the wavelength of 1550 nm. In an optical transmission system having this dispersion-compensating module, average transmission loss is small, average chromatic dispersion has a small absolute value, and optical transmission with a high bit rate is possible in a wide wavelength band (wavelength band including at least the C band and further the L band) including the wavelength of 1550 nm. As a consequence, this optical transmission system can elongate the repeater section and achieve further higher speed and larger capacity in optical communications.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion-compensating optical fiber having a core region extending along a predetermined axis and a cladding region surrounding around the outer periphery of said core region, said dispersion-compensating optical fiber having, at a wavelength of 1550 nm, characteristics of:
    a chromatic dispersion $D_{DCF}$ of −40 ps/nm/km or less; and
    a ratio $(S_{DCF}/D_{DCF})$ of dispersion slope $S_{DCF}$ to the chromatic dispersion $D_{DCF}$ of 0.005/nm or more.

2. A dispersion-compensating optical fiber according to claim 1, wherein said dispersion-compensating optical fiber has, at the wavelength of 1550 nm, characteristics of: the chromatic dispersion $D_{DCF}$ of −100 ps/nm/km or more but −40 ps/nm/km or less; and the ratio $(S_{DCF}/D_{DCF})$ of dispersion slope $S_{DCF}$ to the chromatic dispersion $D_{DCF}$ of 0.005/nm or more but 0.015/nm or less.

3. A dispersion-compensating optical fiber according to claim 1, wherein said dispersion-compensating optical fiber has an effective area of 16 $\mu m^2$ or more at the wavelength of 1550 nm.

4. A dispersion-compensating optical fiber according to claim 3, wherein said dispersion-compensating optical fiber has an effective area of 20 $\mu m^2$ or more at the wavelength of 1550 nm.

5. A dispersion-compensating optical fiber according to claim 1, wherein said dispersion-compensating optical fiber has a cutoff wavelength of 1.2 $\mu m$ or more but 1.8 $\mu m$ or less.

6. A dispersion-compensating optical fiber according to claim 5, wherein said dispersion-compensating optical fiber has a cutoff wavelength of 1.4 $\mu m$ or more but 1.8 $\mu m$ or less.

7. A dispersion-compensating optical fiber according to claim 1, wherein said dispersion-compensating optical fiber has a transmission loss of 0.5 dB/km or less at the wavelength of 1550 nm.

8. A dispersion-compensating optical fiber according to claim 1, wherein said core region has a first refractive index; and
    wherein said cladding region has a first cladding surrounding around the outer periphery of said core region and having a second refractive index lower than the first refractive index, a second cladding surrounding around the outer periphery of said first cladding and having a third refractive index higher than the second refractive index, and a third cladding surrounding around the outer periphery of said second cladding and having a fourth refractive index lower than the third refractive index.

9. A dispersion-compensating optical fiber according to claim 8, wherein said core region has a relative refractive index difference of 0.8% or more but 2.0% or less with reference to said third cladding.

10. A dispersion-compensating optical fiber according to claim 9, wherein said core region has a relative refractive index difference of 0.8% or more but 1.5% or less with reference to said third cladding.

11. A dispersion-compensating optical fiber according to claim 8, wherein said first cladding has a relative refractive index difference of −0.4% or less with reference to said third cladding.

12. A dispersion-compensating optical fiber according to claim 8, wherein the ratio $(S_{DCF}/D_{DCF})$ changes by 10% or less when an outer diameter of said second cladding changes by 2%.

13. A dispersion-compensating optical fiber according to claim 1, wherein said dispersion-compensating optical fiber has, at the wavelength of 1550 nm, characteristics of: the chromatic dispersion $D_{DCF}$ of −250 ps/nm/km or more but −120 ps/nm/km or less; the ratio $(S_{DCF}/D_{DCF})$ of dispersion slope $S_{DCF}$ to the chromatic dispersion $D_{DCF}$ of 0.005/nm or more; and an effective area of 10 $\mu m^2$ or more but 20 $\mu m^2$ or less.

14. A dispersion-compensating optical fiber according to claim 13, wherein the ratio ($S_{DCF}/D_{DCF}$) of dispersion slope $S_{DCF}$ to the chromatic dispersion $D_{DCF}$ is 0.015/nm or less.

15. A dispersion-compensating optical fiber according to claim 13, the effective area falls within a range of (20−|$D_{DCF}$|/25) or more but (23−|$D_{DCF}$|/25) or less.

16. A dispersion-compensating optical fiber according to claim 13, wherein said dispersion-compensating optical fiber has a transmission loss of 1.0 dB/km or less at the wavelength of 1550 nm.

17. A dispersion-compensating optical fiber according to claim 13, wherein said core region has a first refractive index; and wherein said cladding region has a first cladding surrounding around the outer periphery of said core region and having a second refractive index lower than the first refractive index, a second cladding surrounding around the outer periphery of said first cladding and having a third refractive index higher than the second refractive index, and a third cladding surrounding around the outer periphery of said second cladding and having a fourth refractive index lower than the third refractive index.

18. A dispersion-compensating optical fiber according to claim 17, wherein said core region has a relative refractive index difference of 2.0% or more but 3.0% or less with reference to said third cladding.

19. A dispersion-compensating optical fiber according to claim 17, wherein said first cladding has a relative refractive index difference of −0.4% or less with reference to said third cladding.

20. A dispersion-compensating optical fiber according to claim 17, wherein the ratio ($S_{DCF}/D_{DCF}$) changes by 10% or less when an outer diameter of said second cladding changes by 2%.

21. An optical transmission line, comprising:

a dispersion-compensating optical fiber according to claim 1; and a dispersion-shifted optical fiber connected to said dispersion-compensating optical fiber according to claim 1, said dispersion-shifted optical fiber having, at a wavelength of 1550 nm, characteristics of:

a chromatic dispersion of +2 ps/nm/km or more but +10 ps/nm/km or less; and a dispersion slope of +0.04 ps/nm²/km or more but +0.12 ps/nm²/km or less.

22. An optical transmission line according to claim 21, wherein a deviation of an average chromatic dispersion of said entire optical transmission line is 0.2 ps/nm/km or less in a wavelength band of 1535 nm or more but 1560 nm or less.

23. An optical transmission line according to claim 22, wherein the deviation of the average chromatic dispersion of said entire optical transmission line is 0.2 ps/nm/km or less in a wavelength band of 1535 nm or more but 1600 nm or less.

24. A dispersion-compensating module including a dispersion-compensating optical fiber according to claim 1 in a state that said dispersion-compensating optical fiber is wound like a coil so as to form a module.

25. A dispersion-compensating module according to claim 24, wherein said dispersion-compensating module has a total loss is 7 dB or less in a wavelength band of 1535 nm or more but 1565 nm or less when a dispersion-compensating amount is −640 ps/nm at a wavelength of 1550 nm.

26. A dispersion-compensating module according to claim 25, wherein the total loss is 7 dB or less in a wavelength band of 1535 nm or more but 1610 nm or less.

27. A dispersion-compensating module according to claim 24, wherein said dispersion-compensating module has a total loss of 3 dB or less in a wavelength band of 1535 nm or more but 1565 nm or less when a dispersion-compensating amount is −320 ps/nm at a wavelength of 1550 nm.

28. A dispersion-compensating module according to claim 27, wherein the total loss is 3 dB or less in a wavelength band of 1535 nm or more but 1610 nm or less.

29. A dispersion-compensating optical fiber having a core region extending along a predetermined axis and a cladding region surrounding around the outer periphery of said core region, said dispersion-compensating optical fiber having, at a wavelength of 1550 nm, characteristics of:

a chromatic dispersion $D_{DCF}$ of −40 ps/nm/km or less;

a ratio ($S_{DCF}/D_{DCF}$) of dispersion slope $S_{DCF}$ to the chromatic dispersion $D_{DCF}$ of 0.005/nm or more; and an effective area of 16 $\mu$m² or more.

30. A dispersion-compensating optical fiber according to claim 29, wherein the effective area is 20 $\mu$m² or more at the wavelength of 1550 nm.

31. A dispersion-compensating optical fiber having a core region extending along a predetermined axis and a cladding region surrounding around the outer periphery of said core region, said dispersion-compensating optical fiber, having, at a wavelength of 1550 nm, characteristics of:

a chromatic dispersion $D_{DCF}$ of −40 ps/nm/km or less;

a ratio ($S_{DCF}/D_{DCF}$) of dispersion slope $S_{DCF}$ to the chromatic dispersion $D_{DCF}$ of 0.005/nm or more; and a transmission loss of 0.5 dB/km or less.

* * * * *